(12) United States Patent
Lin et al.

(10) Patent No.: US 11,307,085 B2
(45) Date of Patent: Apr. 19, 2022

(54) LIGHT DETECTING DEVICE, LIGHTING MODULE, AND MANUFACTURING METHOD FOR THE SAME

(71) Applicants: LITE-ON OPTO TECHNOLOGY (CHANGZHOU) CO., LTD., Changzhou (CN); LITE-ON TECHNOLOGY CORPORATION, Taipei (TW)

(72) Inventors: Chen-Hsiu Lin, New Taipei (TW); Wen-Hsiang Lin, Taipei (TW); Yung-Chang Jen, New Taipei (TW); Shih-Chung Huang, New Taipei (TW)

(73) Assignees: LITE-ON OPTO TECHNOLOGY (CHANGZHOU) CO., LTD., Changzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/097,158

(22) Filed: Nov. 13, 2020

(65) Prior Publication Data
US 2021/0148558 A1 May 20, 2021

Related U.S. Application Data

(60) Provisional application No. 62/935,671, filed on Nov. 15, 2019.

(30) Foreign Application Priority Data

Nov. 6, 2020 (CN) .......................... 202011233617.X

(51) Int. Cl.
*G01J 1/08* (2006.01)
*F21V 5/00* (2018.01)
(Continued)

(52) U.S. Cl.
CPC ................ *G01J 1/08* (2013.01); *F21V 5/007* (2013.01); *F21V 17/101* (2013.01);
(Continued)

(58) Field of Classification Search
CPC ... G01J 1/08; G01J 1/42; G01J 1/4228; F21V 5/007; F21V 17/101; F21V 31/00;
(Continued)

(56) References Cited

U.S. PATENT DOCUMENTS 9,506,802 B2 * 11/2016 Chu .......................... H01L 33/54
2008/0273327 A1 * 11/2008 Wilcox .................... F21V 5/007
362/267

(Continued)

*Primary Examiner* — Alan B Cariaso
(74) *Attorney, Agent, or Firm* — Li & Cai Intellectual Property (USA) Office

(57) ABSTRACT

A light detecting device, a lighting module, and a manufacturing method for the same are provided. The lighting module includes a carrier, a light assembly having a first lighting unit and a second lighting unit, a lens assembly having a first lens and a second lens, and a casing surrounding the lens assembly. The first lighting unit emits a first beam having a first wavelength through the first lens to define a first view angle and the second lighting unit emits a second beam having a second wavelength through the second lens to define a second view angle. The first wavelength is smaller than the second wavelength, and the first view angle is greater than the second view angle.

19 Claims, 20 Drawing Sheets

(51) Int. Cl.
  *G01J 1/04* (2006.01)
  *G01J 1/42* (2006.01)
  *G03B 21/14* (2006.01)
  *G03B 21/26* (2006.01)
  *H05B 35/00* (2006.01)
  *F21V 17/10* (2006.01)
  *F21Y 105/16* (2016.01)
  *G03B 21/20* (2006.01)
  *F21Y 113/10* (2016.01)
  *F21K 9/90* (2016.01)

(52) U.S. Cl.
  CPC .............. *G01J 1/0474* (2013.01); *G01J 1/42* (2013.01); *G03B 21/145* (2013.01); *G03B 21/26* (2013.01); *H05B 35/00* (2013.01); *F21K 9/90* (2013.01); *F21Y 2105/16* (2016.08); *F21Y 2113/10* (2016.08); *G03B 21/2033* (2013.01)

(58) Field of Classification Search
  CPC .... F21V 31/005; F21V 31/04; H01L 25/0753; H01L 33/483; H01L 33/486; F21Y 2105/16; F21Y 2113/10; F21Y 2113/13; H05B 35/00; F21K 9/90
  See application file for complete search history.

(56) References Cited

U.S. PATENT DOCUMENTS

| | | | |
|---|---|---|---|
| 2012/0326193 A1* | 12/2012 | Park | H01L 33/06 257/98 |
| 2014/0209943 A1* | 7/2014 | Yamamoto | H01L 27/15 257/89 |
| 2014/0232694 A1* | 8/2014 | Alameh | G06F 3/042 345/175 |
| 2015/0102728 A1* | 4/2015 | Kim | G01M 11/065 315/151 |
| 2017/0294564 A1* | 10/2017 | Ho | H01L 25/0753 |
| 2019/0264891 A1* | 8/2019 | Wang | F21V 5/046 |
| 2020/0393121 A1* | 12/2020 | Keresztes | F21V 19/001 |
| 2021/0123583 A1* | 4/2021 | Gastineau | F21V 15/01 |

* cited by examiner

LIGHT DETECTING DEVICE, LIGHTING MODULE, AND MANUFACTURING METHOD FOR THE SAME

CROSS-REFERENCE TO RELATED PATENT APPLICATION

This application claims priority to the U.S. Provisional Patent Application Ser. No. 62/935,671, filed on Nov. 15, 2019, and to China Patent Application No. 202011233617.X, filed on Nov. 6, 2020 in People's Republic of China. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light detecting device, a lighting module, and a manufacturing method for the same, and more particularly to a light detecting device, a lighting module, and a manufacturing method for the same that enhance a receiving accuracy and improve a signal-to-noise ratio.

BACKGROUND OF THE DISCLOSURE

In recent years, wearable devices that can detect heart rates have become popular, but the accuracy of the heart rate detection is oftentimes not reliable.

SUMMARY OF THE DISCLOSURE

In response to the above-referenced technical inadequacies, the present disclosure provides a light detecting device, a lighting module, and a manufacturing method for the same, which enhance detection accuracy.

The present disclosure provides a lighting module including a carrier, a light assembly, a lens, and a casing. The light assembly is disposed on the carrier, and the light assembly includes at least one first lighting unit and at least one second lighting unit. The lens includes at least one first lens and at least one second lens connected to the at least one first lens, and the at least one first lens and the at least one second lens are disposed on the carrier and cover on the light assembly. The casing is disposed on the carrier and surrounding the light assembly. The at least one first lighting unit emits a first beam having a first wavelength, and the first beam passes through the at least one first lens to form a first light distribution being substantially mesa-shaped. The at least one second lighting unit emits a second beam having a second wavelength, and the second beam passes through the at least one second lens to form a second light distribution being substantially twin-peak shaped with a recess in between. The first wavelength is less than the second wavelength, and a first view angle of the first light distribution is greater than a second view angle of the second light distribution.

The present disclosure provides a light detecting device including the afore-mentioned lighting module and a plurality of detecting modules, and the detecting modules surround the lighting module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
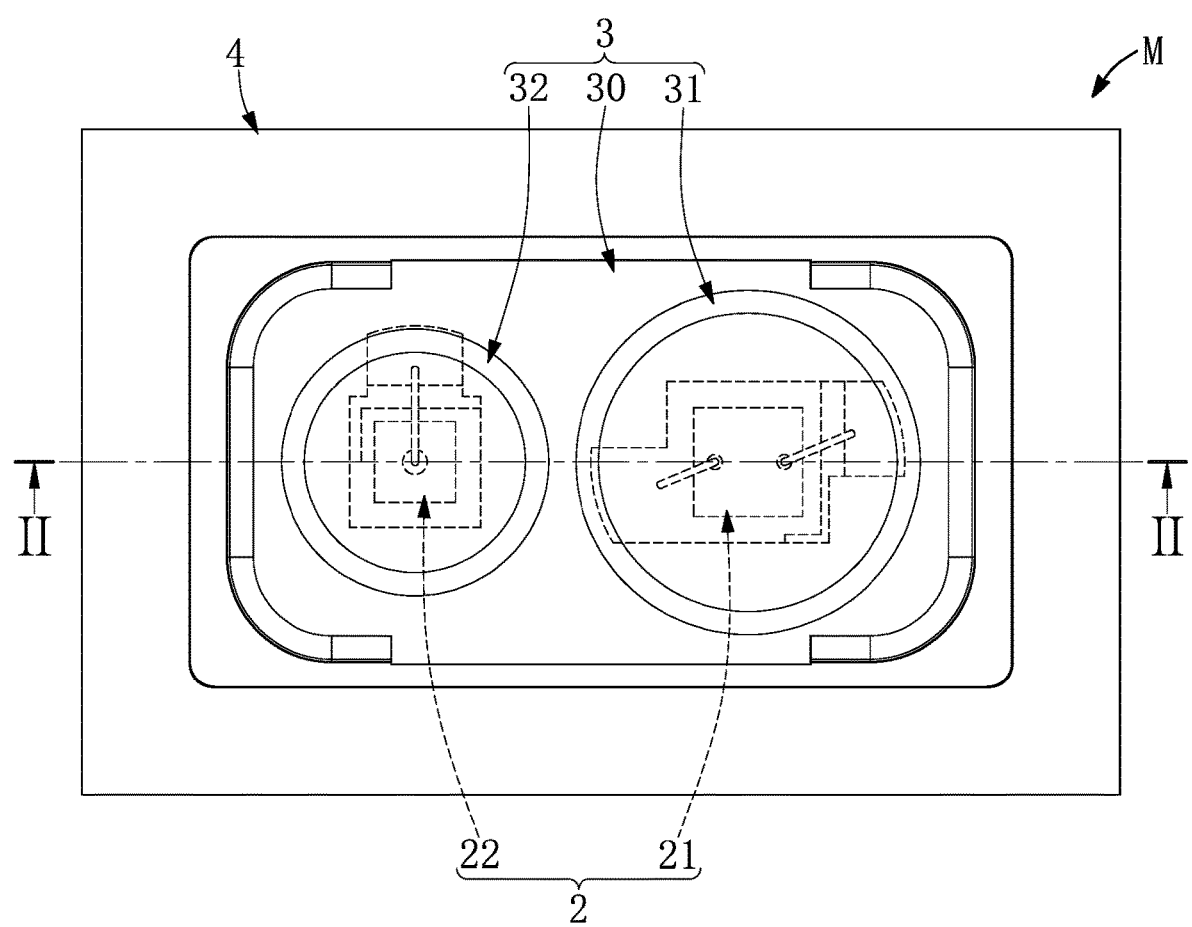
FIG. 1 is a top schematic view of a lighting module in a first embodiment of the present disclosure.
Figure 2:
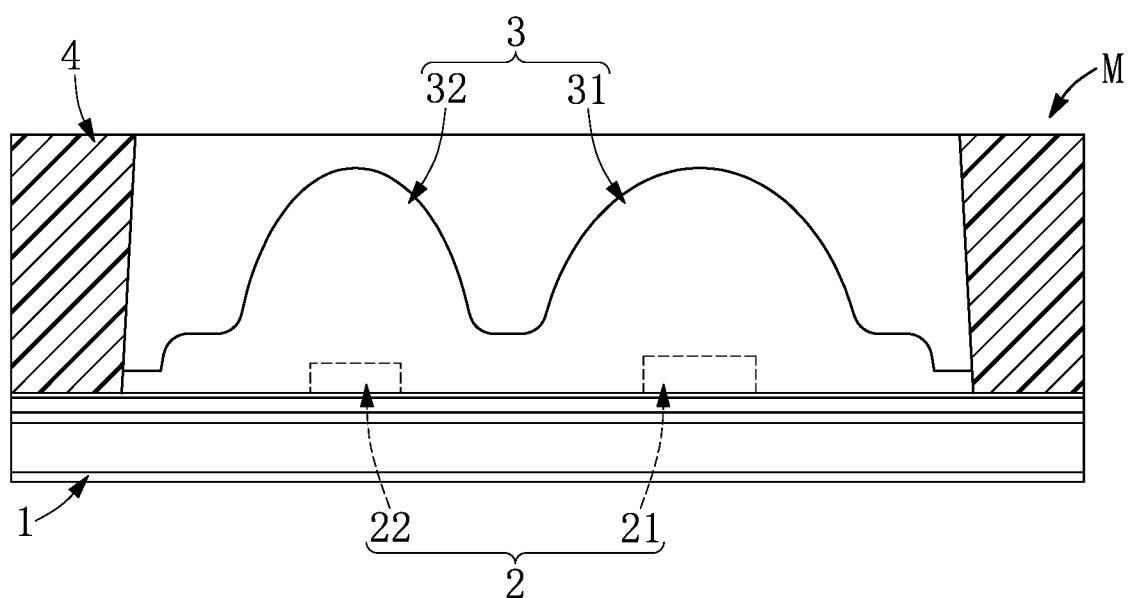
FIG. 2 is a partial cross-sectional view taken along line II-II of FIG. 1.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 5:
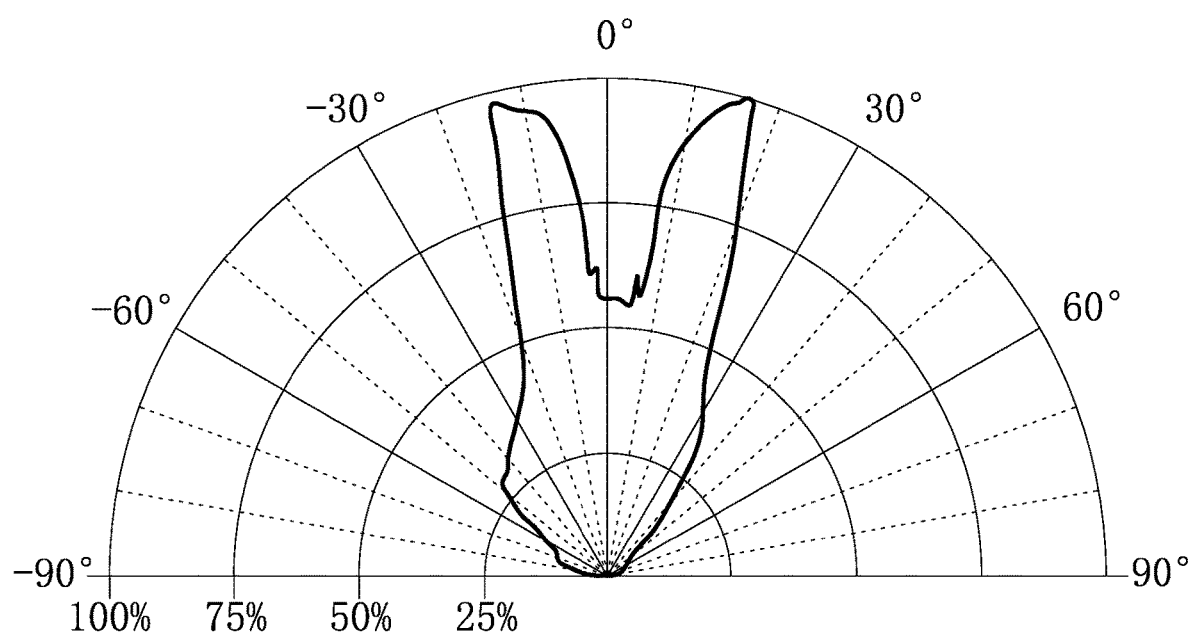
Figure 6:
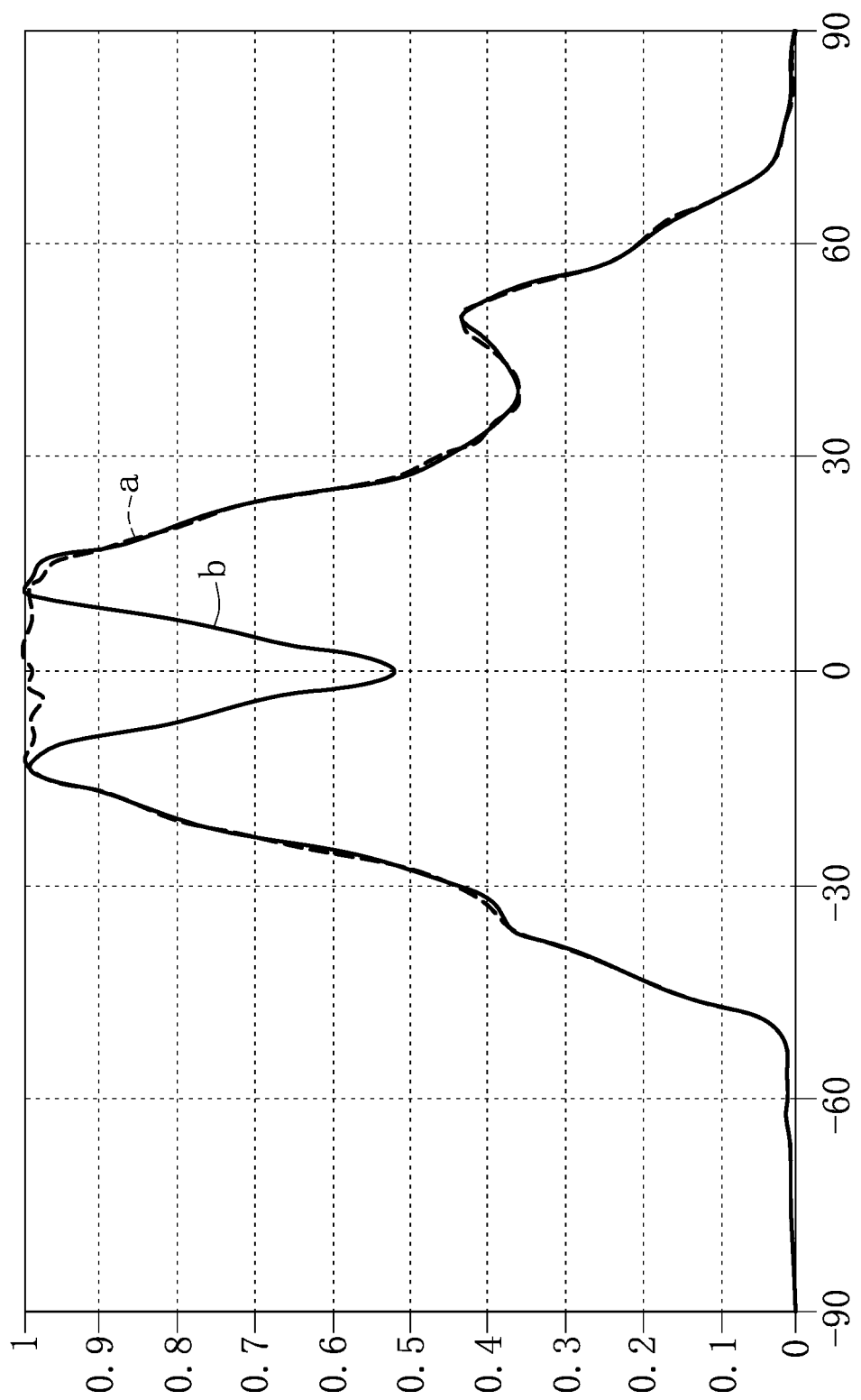
FIG. 6 is a light distribution of a light assembly of the lighting module in the first embodiment of the present disclosure.
Figure 7:
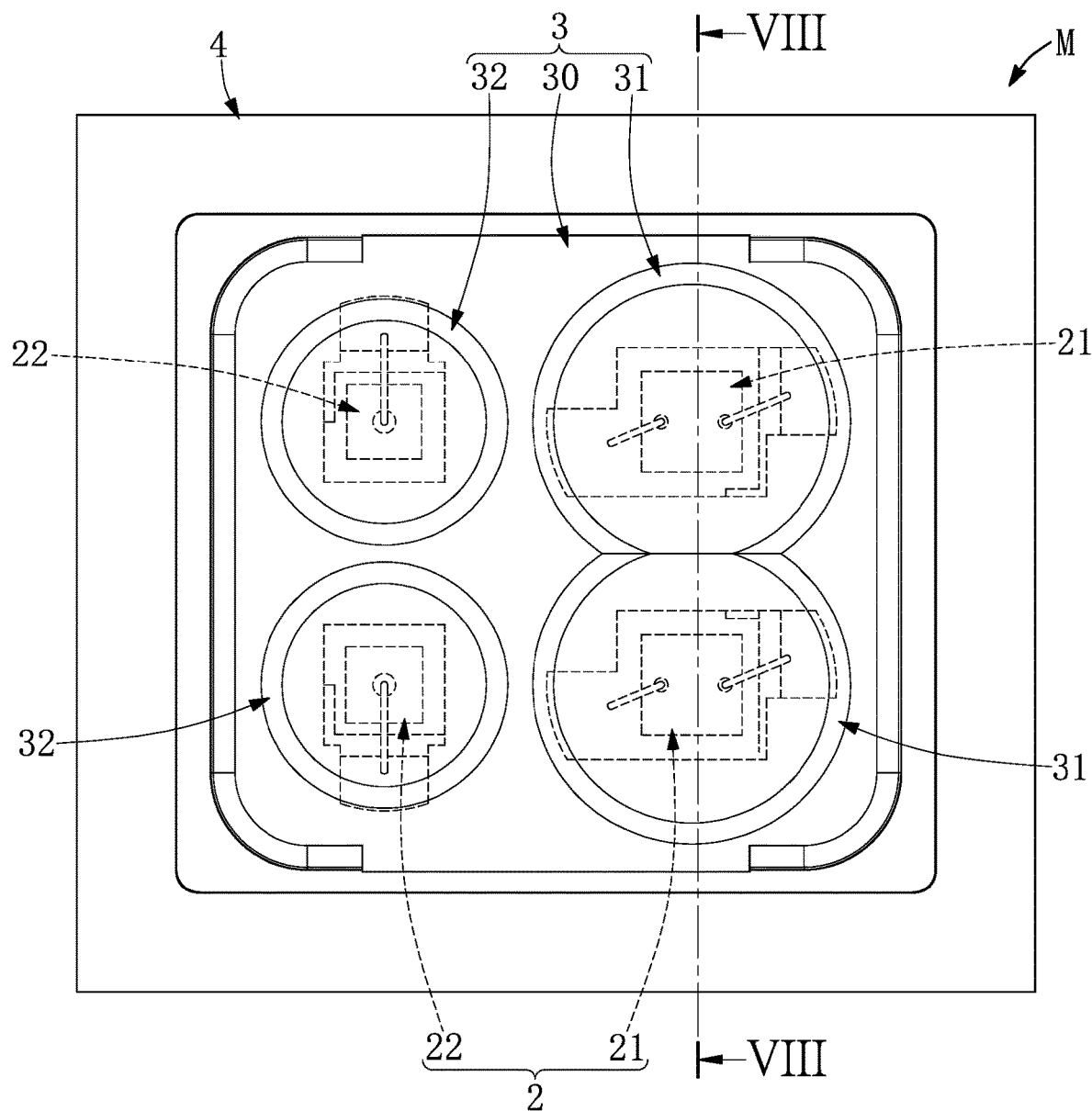
FIG. 7 is another top schematic view of the lighting module in the first embodiment of the present disclosure.

References are made to FIG. 1 to FIG. 8, which are respectively and sequentially a top schematic view, a partial cross-sectional view, a light distribution of a first lighting unit, a first light distribution and a second light distribution of a second lighting unit, a light distribution of a light assembly, and another top schematic view of the lighting module in the first embodiment of the present disclosure, and a partial cross-sectional view taken along line VIII-VIII of FIG. 7. As shown in the figures, a lighting module M is provided in the first embodiment of the present disclosure. The lighting module M includes a carrier 1, a light assembly 2, a lens assembly 3, and a casing 4. The light assembly 2 is disposed on the carrier 1, and the light assembly 2 includes at least one first lighting unit 21 and at least one second lighting unit 22. The lens assembly 3 includes at least one first lens 31 and at least one second lens 32 connected to the at least one first lens 31, and the at least one first lens 31 and the at least one second lens 32 are disposed on the carrier 1 and cover on the light assembly 2. The casing 4 is disposed on the carrier 1 and surrounds the light assembly 3. The at least one first lighting unit 21 emits a first beam having a first wavelength, and the first beam passes through the at least one first lens 31 to form a first light distribution being substantially mesa-shaped. The at least one second lighting unit 22 emits a second beam having a second wavelength, and the second beam passes through the at least one second lens 32 to form a second light distribution being substantially twin-peak shaped with a recess in between. The first wavelength is less than the second wavelength, and a first view angle of the first light distribution is greater than a second view angle of the second light distribution.

Specifically, the lighting module M can include the carrier 1, the light assembly 2, the lens assembly 3, and the casing 4. The carrier 1 can be a light-impermeable circuit board. The light assembly 2 can include the at least one first lighting unit 21 and the at least one second lighting unit 22, the at least one first lighting unit 21 can be a green light emitting diode (LED), and the at least one second lighting unit 22 can be a red LED or an infrared (IR) emitter. The at least one first lighting unit 21 and the at least one second lighting unit 22 are disposed on the carrier 1. The lens assembly 3 can include the at least one first lens 31 and the at least one second lens 32, the at least one first lens 31 can be covered on the at least one first lighting unit 21, and the at least one second lens 32 can be covered on the at least one second lighting unit 22. The lens assembly 3 can further include a lens base 30 that is connected to the at least one first lens 31 and the at least one second lens 32. The casing 4 is a hollow structure in the shape of the letter "O", and can be made of black or white materials. In this embodiment, the casing 4 is exemplified as a square shape, but the present disclosure is not limited thereto. In practice, the casing 4 can be of any geometric shape, e.g., a round shape or a polygonal shape. The casing 4 is disposed on an edge of the carrier 1 and surrounds the light assembly 2 and the lens assembly 3.

Figure 8:
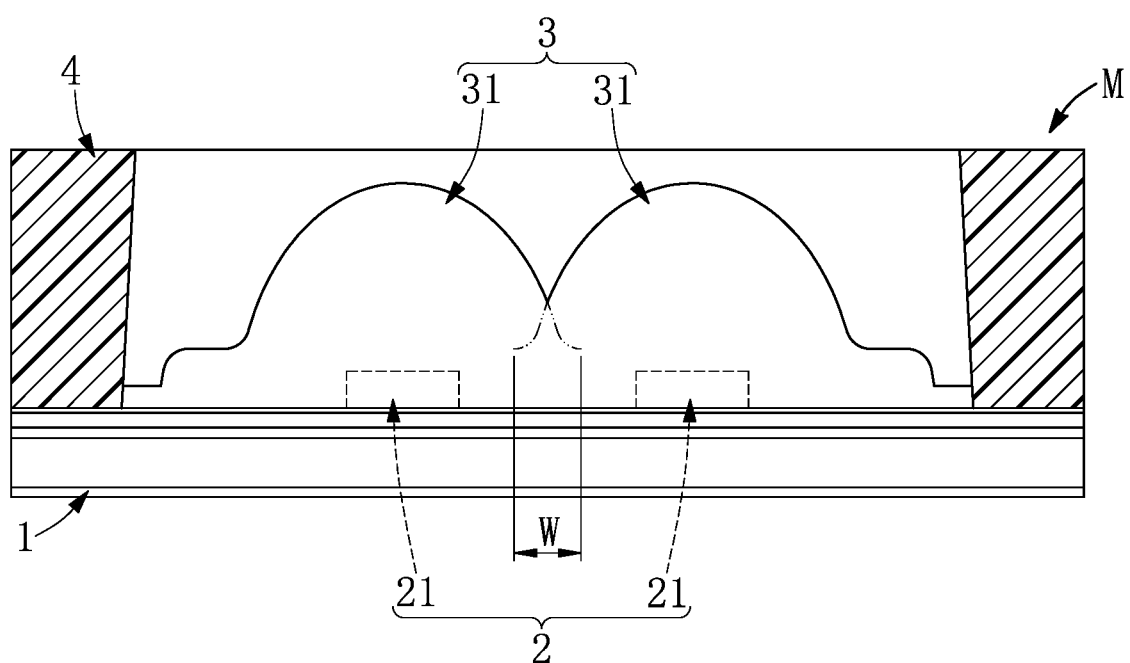
FIG. 8 is a partial cross-sectional view taken along line VIII-VIII of FIG. 7.

The light assembly 2 of the lighting module M provided by the present disclosure basically includes one first lighting unit 21 and one second lighting unit 22, and the lighting module M can include one light assembly 2 (as shown in FIG. 1) or a plurality of light assemblies 2 (as shown in FIG. 7), and the present disclosure is not limited thereto. In addition, each of the light assemblies 2 can also include one first lighting unit 21 and a plurality of second lighting units 22, or a plurality of first lighting units 21 and one second lighting unit 22. Moreover, a quantity of the at least one first lens 31 can be determined by a quantity of the at least one first lighting unit 21, and a quantity of the at least one second lens 32 can be determined by a quantity of the at least one second lighting unit 22. Furthermore, a lens design of the at least one first lens 31 corresponding to the at least one first lighting unit 21 is larger than that of the at least one second lens 32 corresponding to the at least one second lighting unit 22. As shown in FIG. 7 and FIG. 8, two adjacent ones of the first lenses 31 are partially overlapped and intersected with each other. In this implementation, an overlapping distance W is preferably about 0.12 mm Furthermore, the overlapping distance W is predetermined to be equal to a distance of twice a radius of curvature of the at least one first lens 31 being subtracted by a distance between a central point of each of two adjacent ones of the at least one first lighting unit 21, and the distance between the central point of each of two adjacent ones of the at least one first lighting unit 21 is predetermined to be greater than twice a radius of curvature of the at least one second lens 32.

Therefore, when the lighting module M of the present disclosure is in operation, the first light distribution that is substantially mesa-shaped (i.e., a light distribution having a shape of a mesa with a leveled plane at the peak, as shown by a curve a in FIG. 6) can be formed through the at least one first lighting unit 21 emitting the first beam having the first wavelength toward the at least one first lens 31, and then the first beam emitting from the at least one first lens 31 to the outside thereof. In addition, the second light distribution that is in the shape of twin peaks with a recess in between (i.e., a light distribution in a shape of two mountain peaks with a recess extending downwardly in between, as shown by a curve b in FIG. 6) can be formed through the at least one second lighting unit 22 emitting the second beam having the second wavelength toward the at least one second lens 32, and then the second beam emitting from the at least one second lens 32 to the outside thereof. It is worth mentioning that a view angle of each of the two peaks (i.e., the substantially twin-peaked shape) of the second light distribution are defined to be less than 20 degree, and the recess extending downwardly in between the two peaks has a maximum depth of 50% of the second light distribution. That is to say, the view angle each of the two peaks is between a range of ±20 degrees (as shown in FIG. 5 and FIG. 6), and an intensity of the second light distribution at a position of the recess extending downwardly in between is greater than or equal to 50% of that of the two peaks.

When the first beam emitted from the at least one first lens 31 or the second beam emitted from the at least one second lens 32 has a relatively large angle, there is a possibility that the first beam or the second beam does not pass through a subject under test (e.g., the skin of a human body) and directly enters a detector. Therefore, the casing 4 on the carrier 1 can be utilized to block the first beam or the second beam having a relatively large angle.

Therefore, for the lighting module M of the present disclosure, inadequacies in optical design of conventional wearable devices are improved, a receiving accuracy of the detectors surrounding the lighting module M is enhanced, and an effect of receiving signals instantly is realized through utilizing the first beam generated by the at least one first lighting unit 21 having the first light distribution and the second beam generated by the at least one second lighting unit 22 having the second light distribution. In addition, the lighting module M of the present disclosure can also reduce the noise interference and improve the signal-to-noise ratio (SNR) through a cooperation of the lens assembly 3 and the casing 4, thereby enhancing strength of optical signals.

Figure 3:
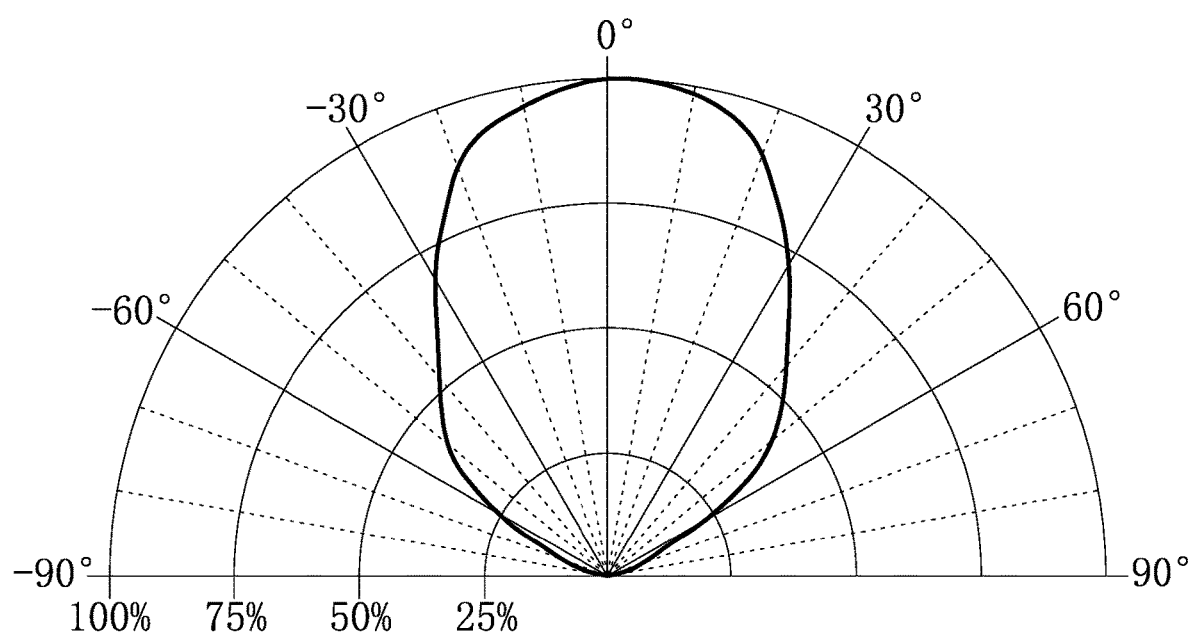
FIG. 3 is a light distribution of a first lighting unit of the lighting module in the first embodiment of the present disclosure.
Figure 4:
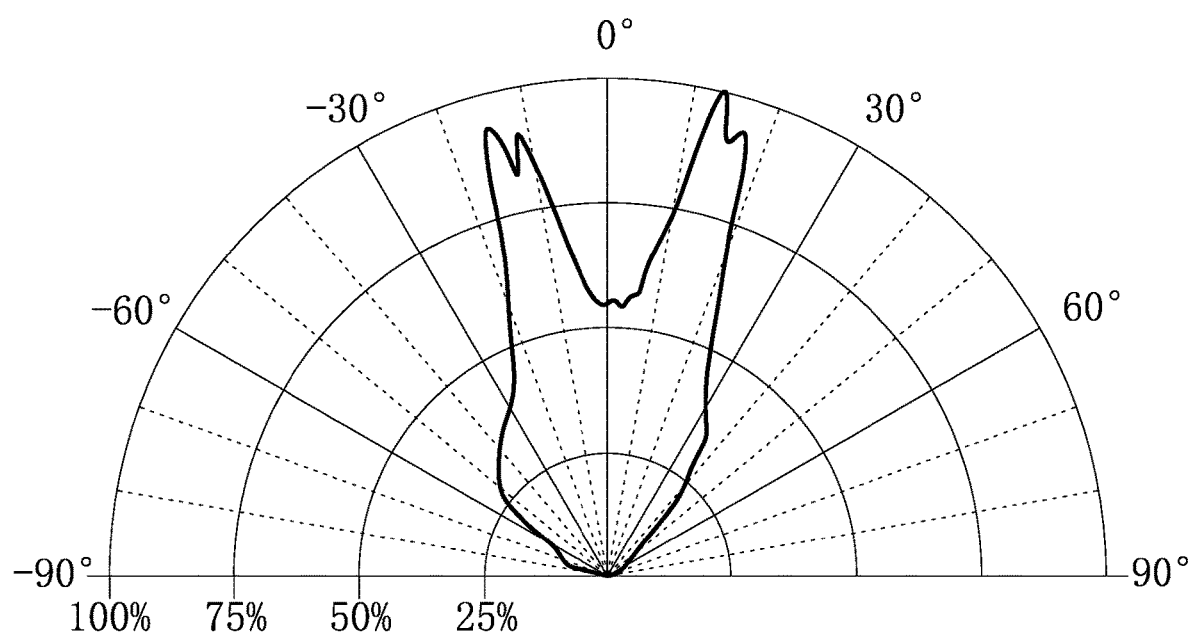
FIG. 4 and FIG. 5 are respectively a first light distribution and a second light distribution of a second lighting unit of the lighting module in the first embodiment of the present disclosure.

Furthermore, the first view angle of the at least one first lighting unit 21 can be greater than 80 degrees (as shown in FIG. 3), and the first wavelength can be between 500 nm and 550 nm, and is preferably 525 nm. The second view angle of the at least one second lighting unit 22 can be less than 60 degrees (as shown in FIG. 4 and FIG. 5), and the second wavelength can be between 660 nm and 940 nm. When the at least one second lighting unit 22 is a red LED, the second wavelength is preferably 660 nm. Further, when the at least one second lighting unit 22 is an IR emitter, the second wavelength is preferably 940 nm. Therefore, the first wavelength is less than the second wavelength, and the first view angle of the first light distribution is greater than the second view angle of the second light distribution. In addition, a radius of curvature of the lens assembly 3 is between 0.1 mm and 2 mm, and a radius of curvature of the at least one first lens 31 is greater than that of the at least one second lens 32. When the lighting module M includes only one lens assembly 3 (as shown in FIG. 1), a radius of curvature of the at least one first lens 31 can be between 0.55 mm and 1.75 mm, and a radius of curvature of the at least one second lens 32 can be between 0.35 mm and 1.15 mm. When the lighting module M includes a plurality of lens assemblies 3 (as shown in FIG. 7), a radius of curvature of the at least one first lens 31 can be between 0.9 mm and 1.4 mm, and a radius of curvature of the at least one second lens 32 can be between 0.6 mm and 0.9 mm However, the above-mentioned embodiment is merely one of the feasible implementations, and the present disclosure is not limited thereto.

Second Embodiment

Figure 9:
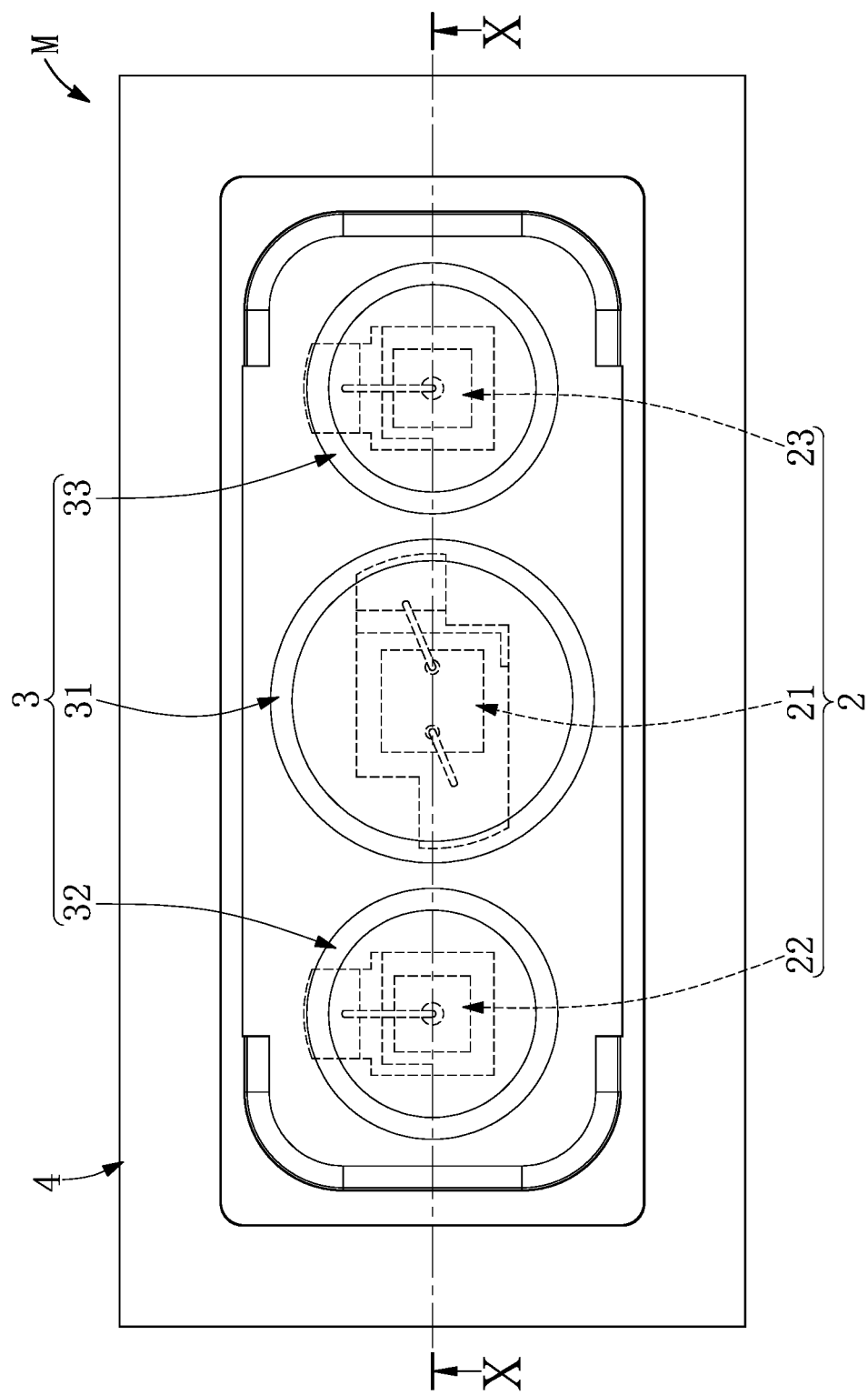
FIG. 9 is a top schematic view of the lighting module in a second embodiment of the present disclosure.
Figure 10:
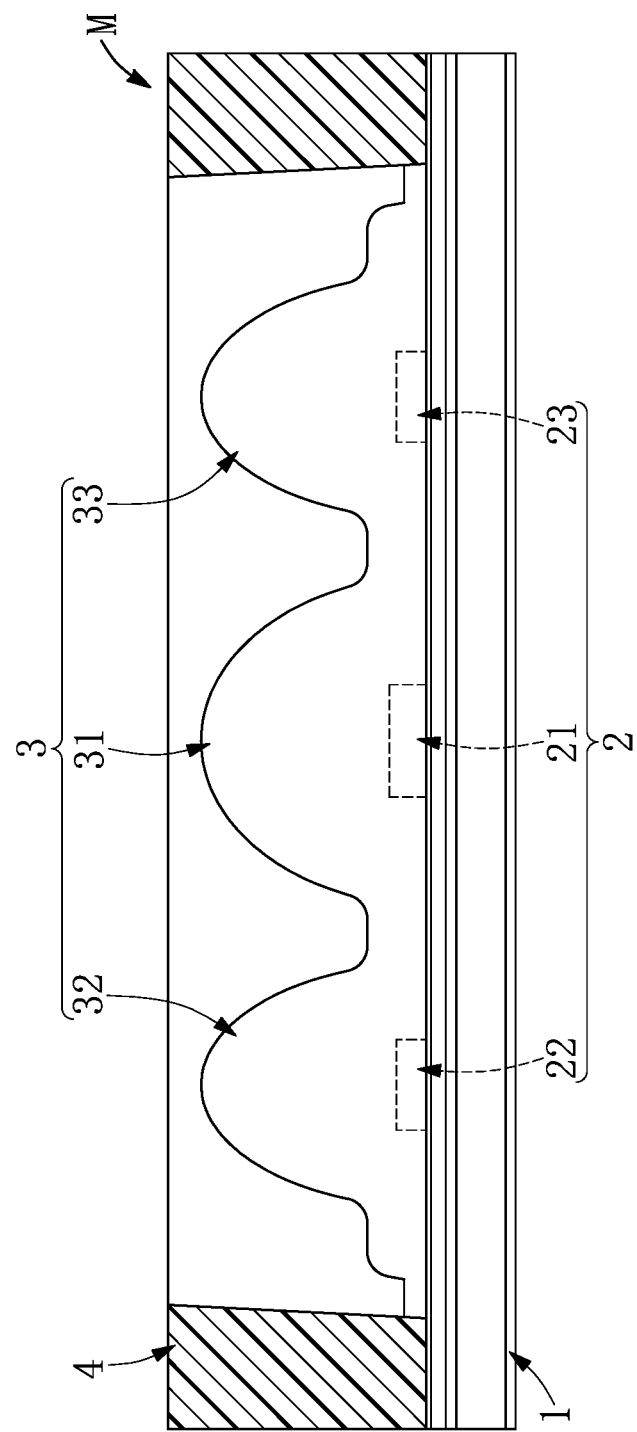
FIG. 10 is a partial cross-sectional view taken along line X-X of FIG. 9.
Figure 11:
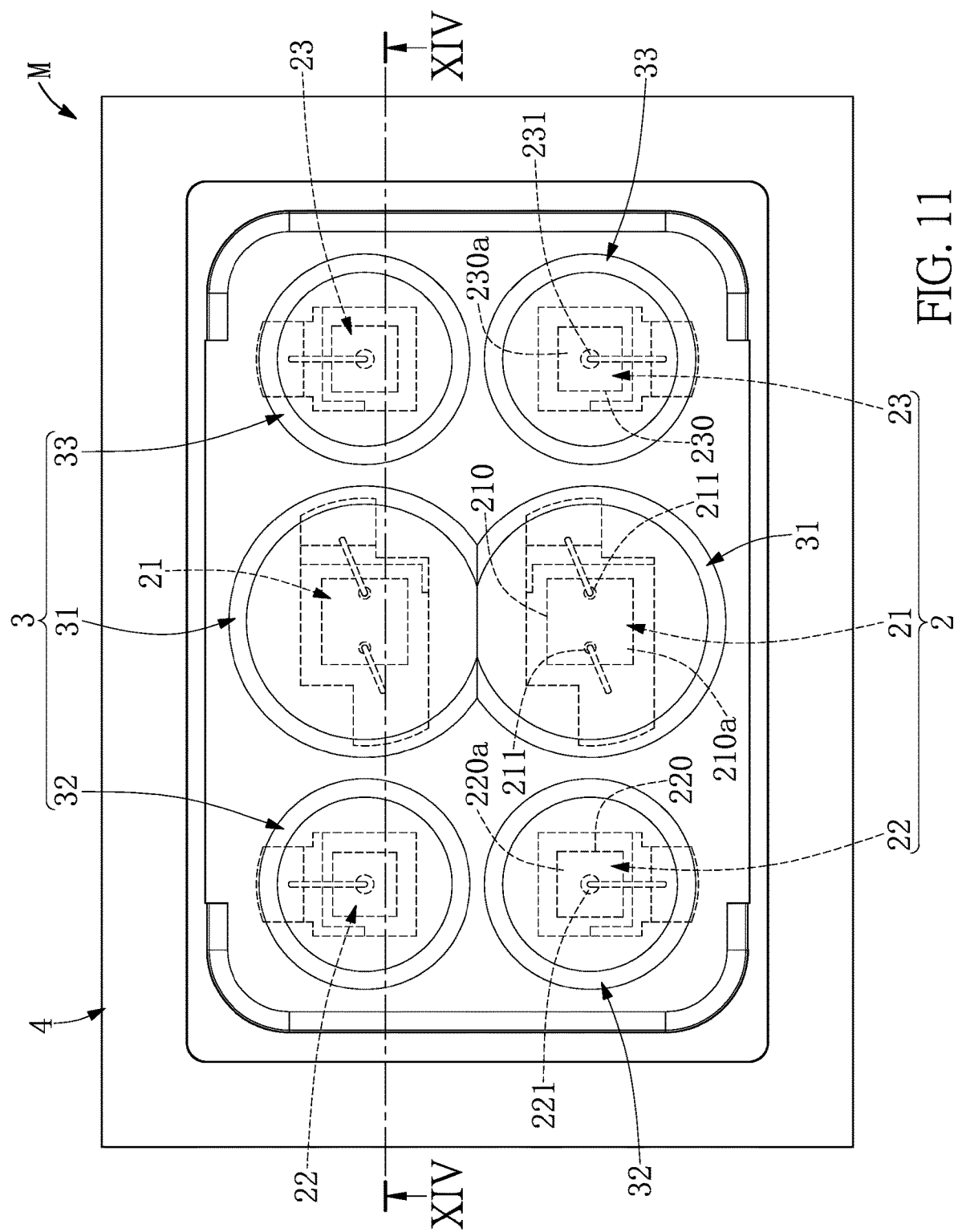
FIG. 11 is another top schematic view of the lighting module in the second embodiment of the present disclosure.

References are made to FIG. 9 to FIG. 14, which are respectively and sequentially a top schematic view, a partial cross-sectional view taken along line X-X of FIG. 9, another top schematic view, a perspective schematic view, a partial exploded view, and a partial cross-sectional view taken along line XIV-XIV of FIG. 11 of a lighting module of a second embodiment of the present disclosure, and are to be read in conjunction with FIG. 1 to FIG. 8. As shown in the figures, the lighting module in the second embodiment has a similar mechanism to that of the lighting module described in the first embodiment, and will not be reiterated herein. It is worth noticing that, in this embodiment, the lens assembly 3 can further include at least one third lens 33 connected to the at least one first lens 31, and the at least one third lens 33 is disposed on the carrier 1 and covers on the light assembly 2. In addition, the light assembly 2 further includes at least one third lighting unit 23. The at least one third lighting unit 23 emits a third beam having a third wavelength, the third beam passes through the at least one third lens 33 to form a third light distribution being substantially twin-peak shaped with a recess in between, the third wavelength is greater than the first wavelength, and a third view angle of the third light distribution is less than the first view angle.

For example, the light assembly 2 of the present disclosure can include the at least one third lighting unit 23. The at least one third lighting unit 23 can be a red LED or a IR emitter, and the at least one third lighting unit 23 is different from the at least one second lighting unit 22. The at least one third lighting unit 23 is disposed on the carrier 1. The at least one first lighting unit 21 is positioned at a center of the carrier 1 (i.e., a central area of where the lighting module M is sealed), the at least one second lighting unit 22 is disposed adjacent to and on one side of the at least one first lighting unit 21, and the at least one third lighting unit 23 is disposed adjacent to and on another side of the at least one first lighting unit 21. That is to say, the at least one first lighting unit 21 is disposed between the at least one second lighting unit 22 and the at least one third lighting unit 23. Moreover, the lens assembly 3 can include the at least one third lens 33, and the at least one third lens 33 can cover on the at least one third lighting unit 23. The light assembly 2 of the lighting module M provided by the present disclosure essentially includes one first lighting unit 21, one second lighting unit 22, and one third lighting unit 23, and the lighting module M can include one light assembly 2 or a plurality of the light assemblies 2, but the present disclosure is not limited thereto. Moreover, a quantity of the at least one third lens 33 can be determined by a quantity of the at least one third lighting unit 23. As shown in FIG. 10, when the lighting module M includes a plurality of light assemblies 2, a plurality of first lighting units 21 can be green LEDs. In addition, in FIG. 10, a second lighting unit 22 on the upper left and a third lighting unit 23 on the lower right can be red LEDs, and another third lighting unit 23 on the upper right and another second lighting unit 22 on the lower left can be IR emitters. However, in practice, the present disclosure is not limited thereto. The first view angle of the at least one first lighting unit 21 can be greater than 80 degrees (as shown in FIG. 3). The second view angle of the at least one second lighting unit 22 and the third view angle of the at least one third lighting unit 23 can be less than 60 degrees (as shown in FIG. 4 and FIG. 5). Furthermore, a lens design of the at least one first lens 31 corresponding to the at least one first lighting unit 21 is larger than those of the at least one second lens 32 and the at least one third lens 33, and two adjacent ones of the first lenses 31 are partially overlapped and intersected with each other (as shown in FIG. 8).

Furthermore, the first lighting units 21, the second lighting units 22, and the third lighting units 23 are disposed equidistantly. That is to say, a distance between two adjacent ones of the first lighting units 21 is equal to a distance between two adjacent ones of the second lighting units 22, and is equal to a distance between two adjacent ones of the third lighting units 23. In addition, a distance between one first lighting unit 21 and one second lighting unit 22 is equal to a distance between another first lighting unit 21 and another second lighting unit 22, and a distance between one first lighting unit 21 and one third lighting unit 23 is equal to a distance between another first lighting unit 21 and another third lighting unit 23.

Therefore, when the lighting module M of the present disclosure is in operation, the third light distribution being substantially twin-peak shaped with a recess in between (i.e., a light distribution in a shape of two mountain peaks with a recess extending downwardly in between, as shown by the curve b in FIG. 6) can be formed through the at least one third lighting unit 23 emitting the third beam having the third wavelength toward the at least one third lens 33, and then the third beam emitting from the at least one third lens 33 to the outside thereof. When the third beam emitted from the at least one third lens 33 has a relatively large angle, the casing 4 on the carrier 1 can be utilized to block the third beam having a relatively large angle.

The third view angle of the at least one third lighting unit 23 can be less than 60 degrees, the third wavelength can be between 660 nm and 940 nm, and the third wavelength is different from the second wavelength. When the at least one third lighting unit 23 is a red LED, the third wavelength is preferably 660 nm, and when the at least one third lighting unit 23 is an IR emitter, the third wavelength is preferably 940 nm.

Furthermore, the at least one first lighting unit 21 can include a first light emitting chip 213 having a first light emitting surface 210a and a plurality of first chip pads 211, and the first chip pads 211 are respectively disposed on two sides of the first light emitting surface 210a. The at least one second lighting unit 22 can include a second light emitting chip 220 having a second light emitting surface 220a and a second chip pad 221, and the second chip pad 221 is disposed at a center of the second light emitting surface 220a. The at least one third lighting unit 23 can include a third light emitting chip 230 having a third light emitting surface 230a and a third chip pad 231, and the third chip pad 231 is disposed at a center of the third light emitting surface 230a.

For example, referring to FIG. 10, in the present disclosure, the at least one first lighting unit 21 forms the first light distribution being substantially mesa-shaped through having the first chip pads 211 respectively disposed on two sides of the first light emitting surface 210a of the first chip 210, thereby allowing the first beam from the first light emitting surface 210a to be emitted toward the at least one first lens 31, and then emitted from the at least one first lens 31 to the outside thereof. In addition, the at least one second lighting unit 22 forms the second light distribution having a recess in the middle through having the second chip pad 221 disposed at the center of the second light emitting surface 220a, thereby allowing the second beam from the second light emitting surface 220a to be emitted toward the at least one second lens 32, and then emitted from the at least one second lens 32 to the outside thereof. Similarly, the at least one third lighting unit 23 forms the third light distribution being substantially twin-peak shaped with a recess in between through having the third chip pad 231 disposed at the center of the third light emitting surface 230a, thereby allowing the third beam from the third chip pad 231 to be emitted toward the at least one third lens 33, and then emitted from the at least one third lens 33 to the outside thereof.

Furthermore, an upper surface 10a of the carrier 1 is divided into a protrusion section 100a and a recess section 100b surrounding the protrusion section 100a, and a first distance d1 between the protrusion section 100a and a lower surface 10b of the carrier 1 is greater than a second distance d2 between the recess section 100b and the lower surface 10b of the carrier 1. The light assembly 2 and the lens assembly 3 are positioned at the protrusion section 100a, and the casing 4 is positioned at the recess section 100b.

Figure 12:
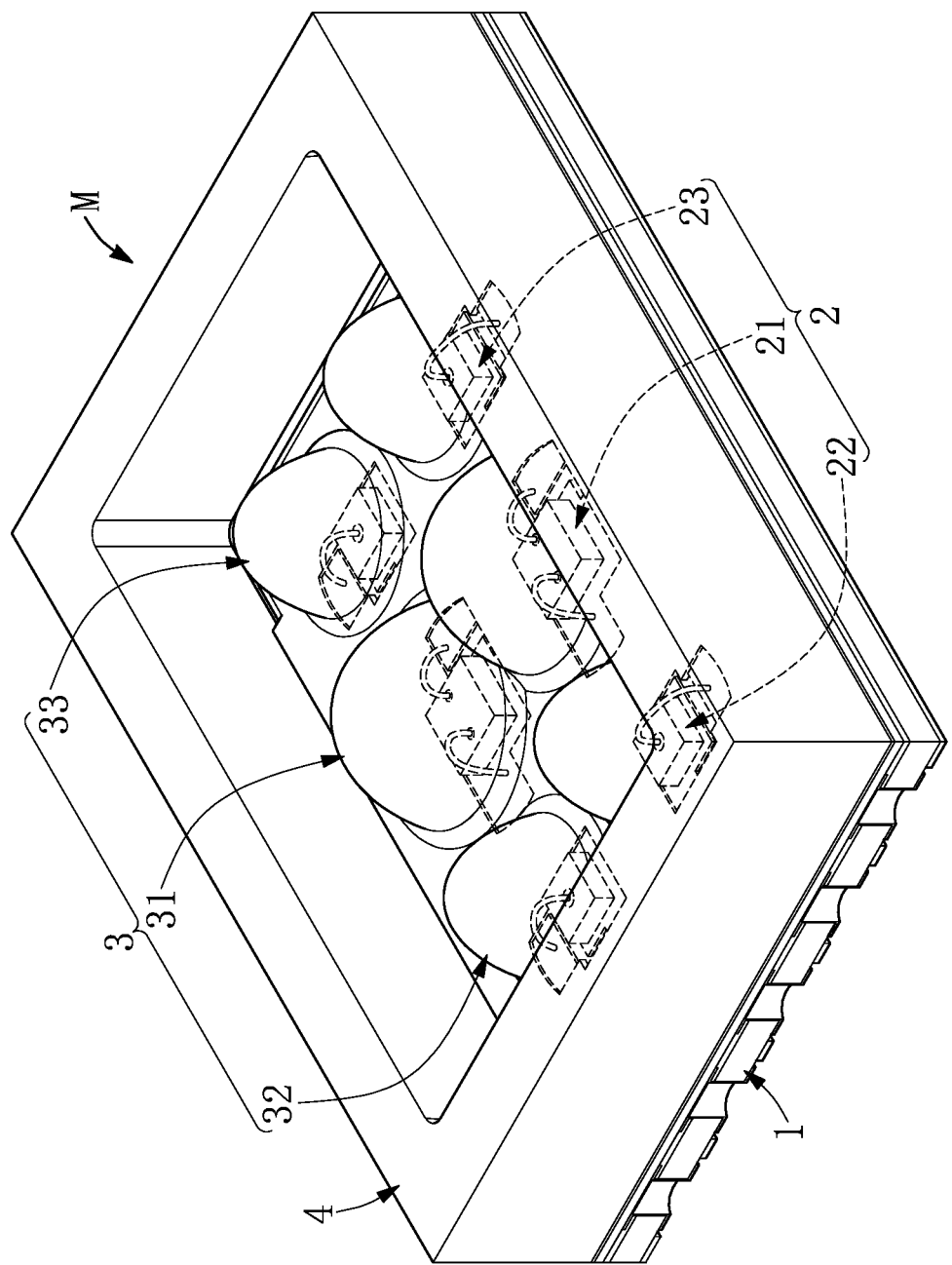
FIG. 12 is a perspective schematic view of the lighting module of the second embodiment of the present disclosure.
Figure 13:
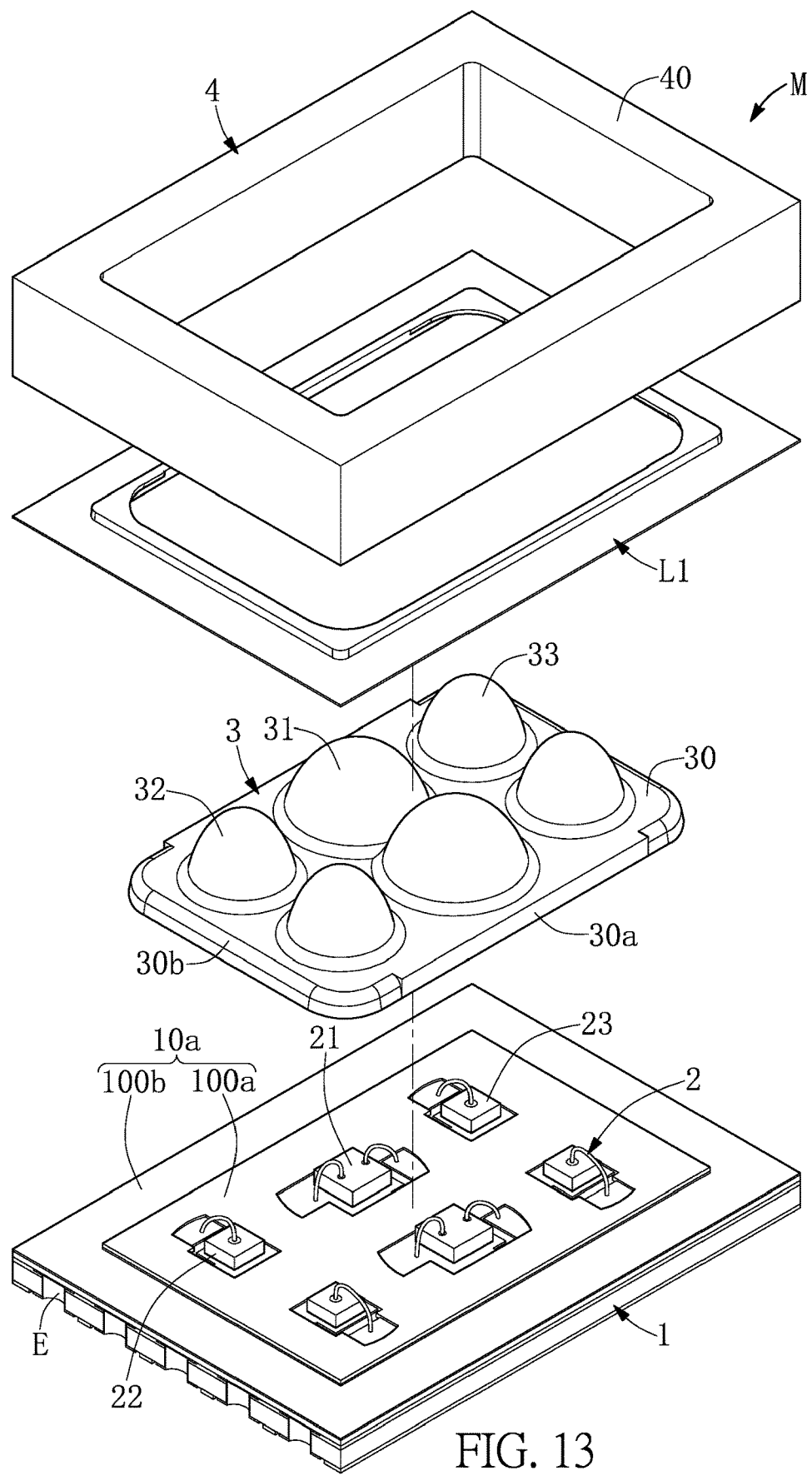
FIG. 13 is a partial exploded view of the lighting module of the second embodiment of the present disclosure.

For example, the carrier 1 includes the upper surface 10a and the lower surface 10b opposite to the upper surface 10a. The upper surface 10a of the carrier 1 can be divided into the protrusion section 100a positioned at a central area of the carrier 1 and the recess section 100b in the shape of the letter "O" surrounding the protrusion section 100a (as shown in FIG. 12). Referring to FIG. 12 and FIG. 13, a cross-sectional surface of the carrier 1 can be of a shape having a protrusion in the middle. A thickness (the first distance d1) between a surface of the protrusion section 100a and the lower surface 10b of the carrier 1 is greater than another thickness (the second distance d2) between a surface of the recess section 100b and the lower surface 10b of the carrier 1.

Furthermore, an adhesive L1 is disposed among the casing 4, the carrier 1 and the lens assembly 3. The casing 4 has a lower surface 41 facing toward the recess section 100b and an upper surface 40 opposite to the lower surface 41. A third distance d3 between the lower surface 41 of the casing 4 and the lower surface 10b of the carrier is less than the first distance d1, and is greater than the second distance d2.

For example, referring to FIG. 12 and FIG. 13, the adhesive L1 is disposed on the recess section 100b of the carrier 1. When the casing 4 is disposed on the recess section 100b, the lower surface 41 of the casing 4 presses against the adhesive L1 such that a part of the adhesive L1 flows to gaps between the casing 4 and the lens assembly 3, the adhesive L1 is in contact with sides of the lens assembly 3 and inner walls of the casing 4, and an adhesive surface L10 of the adhesive L1 is higher than the protrusion section 100a (i.e., a fourth distance d4 is defined between the adhesive surface L10 and the lower surface 10b of the carrier 1, and the fourth distance d4 is greater than the first distance d1).

Therefore, after the adhesive L1 is cured, the lens assembly 3 and the casing 4 can be strongly adhered to and fixed on the carrier 1. Furthermore, the problem of light leakage is reduced through a structural design of the cross-sectional surface of the upper surface 10a of the carrier 1 being of the shape having a protrusion in the middle (i.e., the recess section 100b being lower than the protrusion section 100a), and the lower surface 41 of the casing 4 being lower than the protrusion section 100a after the casing 4 is disposed on the recess section 100b by the adhesive L1, such that beams with relatively large view angles from the light assembly 2 can be blocked by the casing 4 from emitting to the outside through the adhesive L1 between the lower surface 41 of the casing 4 and the recess section 100b of the carrier 1 to the outside of the lighting module M. In other words, after the adhesive L1 is cured, the adhesive L1 can have a two-stepped structure (as shown in FIG. 13), e.g., a three-dimensional resin structure having the shape of the letter "L" or the shape of the letter "M". The two-stepped structure has an upright part that partially surrounds a bottom side of the lens assembly 3 and an inner-bottom side of the casing 4, and the two-stepped structure has a horizontal part that supports the casing 4 and adheres to the carrier 1. Furthermore, the adhesive L1 is preferably a gel or an adhesive with a dark color that can block light with predetermined wavelengths (e.g., visible light, or inclusive of near and far infrared light) and provide a light-shielding effect. Moreover, the recess section 100b of the shape the letter "O" on the upper surface 10a of the carrier 1 corresponds to the casing 4 of the shape the letter "O", and the carrier 1 and the casing 4 are adhered to each other through the adhesive L1. In addition, the surface of the recess section 100b can be roughened, which increases the friction and area of contact between the recess section 100b and the adhesive L1, thereby increasing a bonding therebetween.

Furthermore, the carrier 1 includes a first shielding member 11, a first circuit member 12, a first carrier member 13, a second circuit member 14, a second carrier member 15, a third circuit member 16, and a second shielding member 17. The first circuit member 12 is disposed on an upper surface 130 of the first carrier member 13, the first shielding board 11 is disposed on the upper surface 130 of the first carrier member 13 and shields a part of the first circuit member 12, the second circuit member 14 is disposed between a lower surface 131 of the first carrier member 13 and an upper surface 150 of the second carrier member 15, the third circuit member 16 is disposed on a lower surface 151 of the second carrier 15, the second circuit member 14 is connected to the third circuit member 16, and the second shielding member 17 is disposed on the lower surface 151 of the second carrier member 15 and shields a part of the third circuit member 16. The light assembly 2 and the lens assembly 3 are disposed on the first shielding member 11, and the light assembly 2 is electrically connected to the first circuit member 12.

Figure 14:
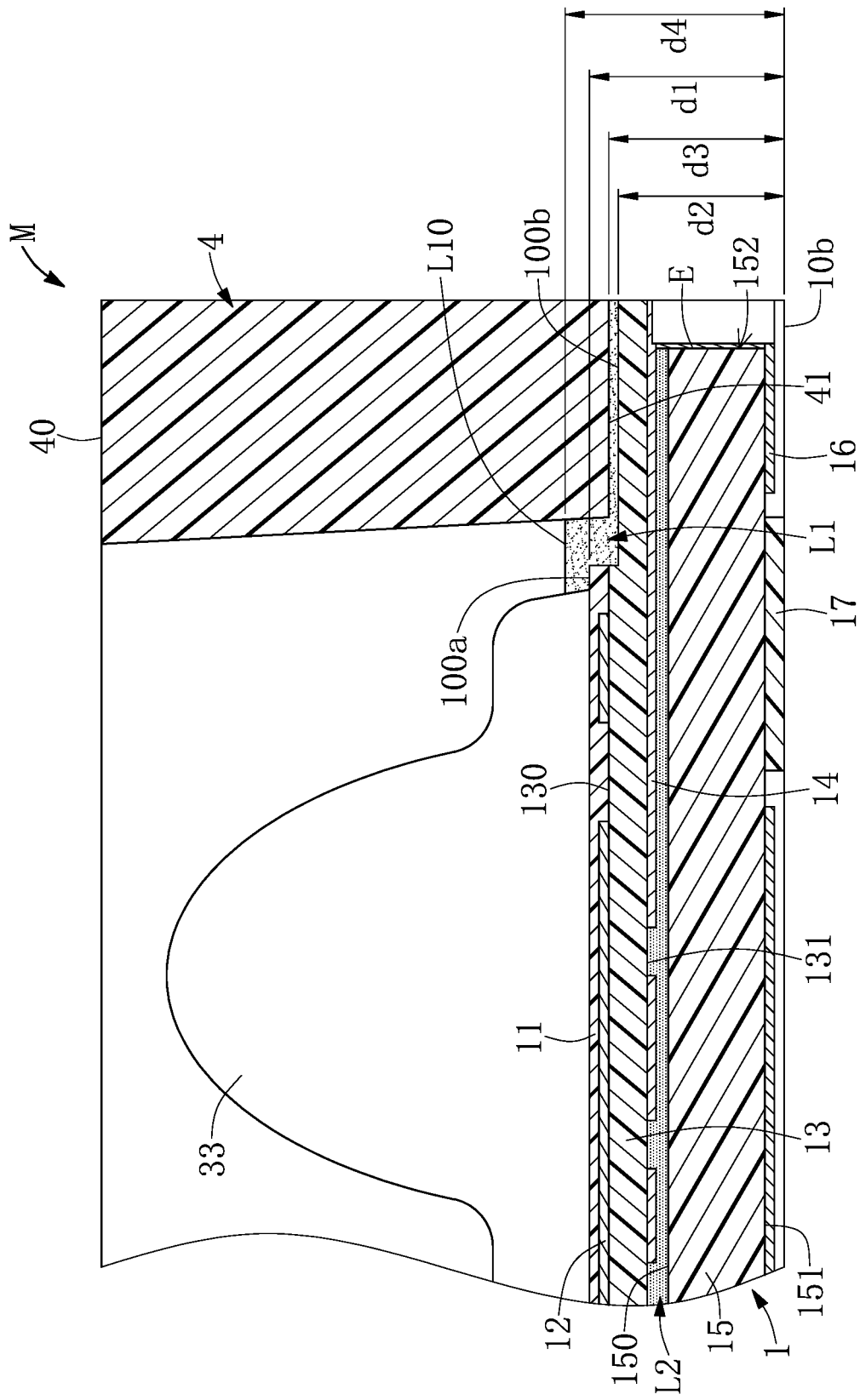
FIG. 14 is a partial cross-sectional view taken along line XIV-XIV of FIG. 11.

For example, referring to FIG. 14, the first shielding member 11 and the second shielding member 17 can each be a solder mask, the first carrier member 13 and the second carrier member 15 can each be a light-impermeable carrier (e.g., a dark/black printed circuit board that shields or absorbs light), and the first circuit member 12, the second circuit member 14, and the third circuit member 16 can each be a metal wire, but the present disclosure is not limited thereto. The first circuit member 12 can also be connected to the second circuit member 14. In addition, an adhesive L2 can be disposed between the first carrier member 13 and the second carrier member 15, the adhesive L2 can be made of a light-impermeable epoxy resin (e.g., prepreg), but the present disclosure is not limited thereto. The first carrier member 13 and the second carrier member 15 can also form a light-impermeable carrier through heat pressing. Therefore, the crosstalk can be effectively reduced by 2.3 times, and strength of optical signals of the lighting module M can be enhanced through the light-impermeable carrier formed by the first carrier member 13, the adhesive L2, and the second carrier member 15 in the present disclosure.

Furthermore, a plurality of semi-blind holes 152 can be formed on a side of the second carrier member 15, and a sidewall of each of the semi-blind holes 152 can be coated with a metal layer E (e.g., copper, but the present disclosure is not limited thereto), such that the second circuit member 14 and the third circuit member 16 are conducted to each other through the metal layer E. Therefore, a soldering strength of the second carrier member 15 on the Z axis (vertical direction) can be enhanced, and difficulties in controlling a covering depth of via holes of the second shielding member 17 can be diminished, thus improving an efficiency of soldering.

However, the above-mentioned embodiment is merely one of the feasible implementations, and the present disclosure is not limited thereto.

Third Embodiment

Figure 15:
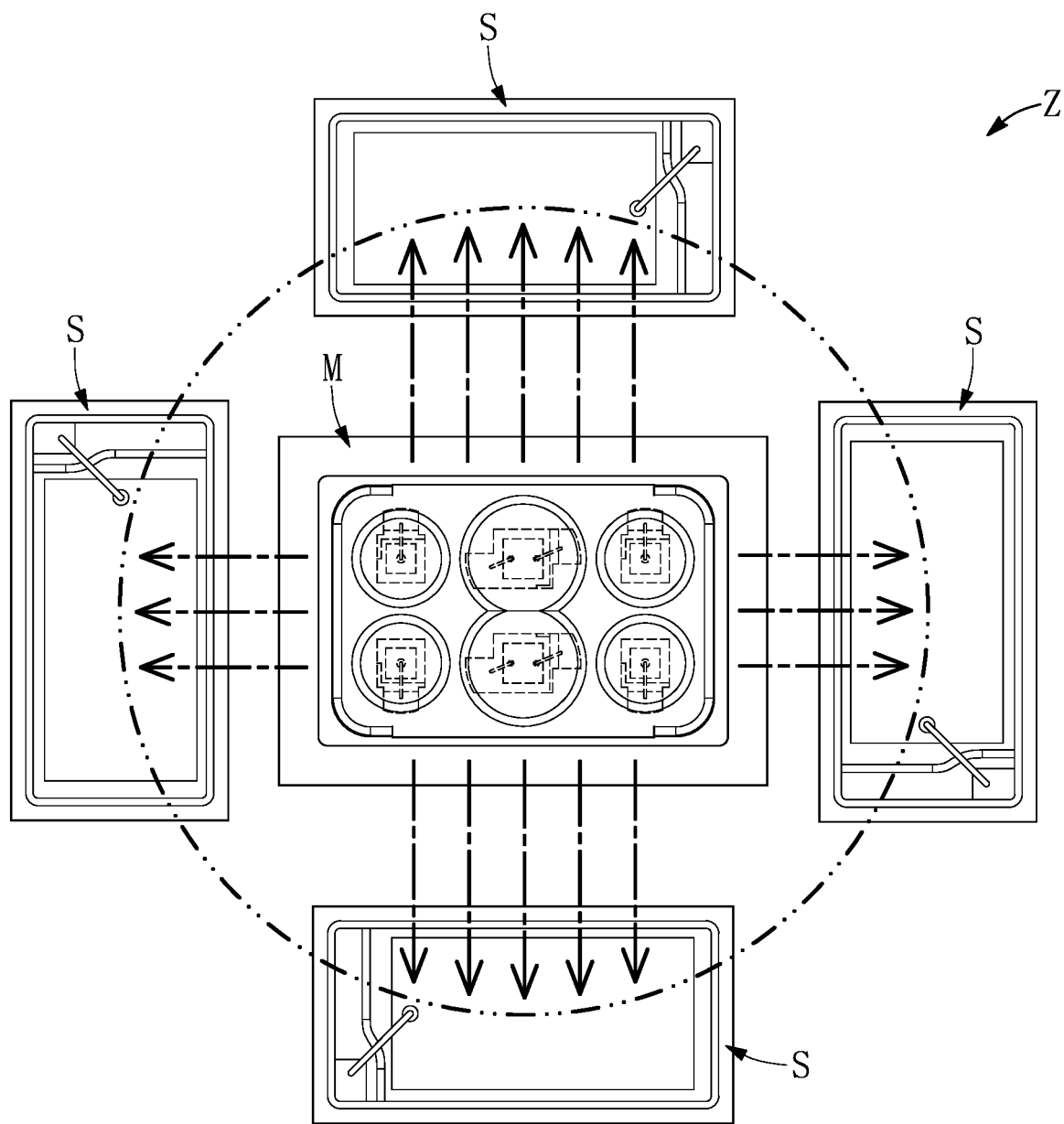
FIG. 15 is a top schematic view of a light detecting device in a third embodiment of the present disclosure.

Reference is made to FIG. 15, which is to be read in conjunction with FIG. 1 to FIG. 14. FIG. 15 is a top schematic view of a light detecting device in a third embodiment of the present disclosure. As shown in the figures, a light detecting device Z is provided in the third embodiment of the present disclosure. The light detecting device Z includes one of the lighting modules M described in the first embodiment and the second embodiment and a plurality of detecting modules S, and the detecting modules S surround the lighting module M.

For example, the light detecting device Z can include four of the detecting modules S which are positioned at four sides of the one of the lighting modules M. Therefore, when the light detecting device Z is positioned at the center of the lighting module M through the at least one first lighting unit 21 and the first view angle is greater than 80 degrees, a detecting area can be increased such that the four of the detecting modules S at the four sides of the lighting module M receive signals. In addition, detecting strength on the sides of the light detecting device Z of the present disclosure can be enhanced, and vertical incident light and vertical reflecting light of the light detecting device Z can also be reduced through the second beam of the at least one second lighting unit 22 having the second light distribution being less than 60 degrees or the third beam of the at least one third lighting unit 23 having the third light distribution being less than 60 degrees.

Furthermore, a structural design of the light detecting device Z of the present disclosure adopting the detecting modules S surrounding two lighting units corresponding to each other increases the receiving accuracy and increases a battery life thereof by saving power.

However, the above-mentioned embodiment is merely one of the feasible implementations, and the present disclosure is not limited thereto.

Fourth Embodiment

Figure 16:
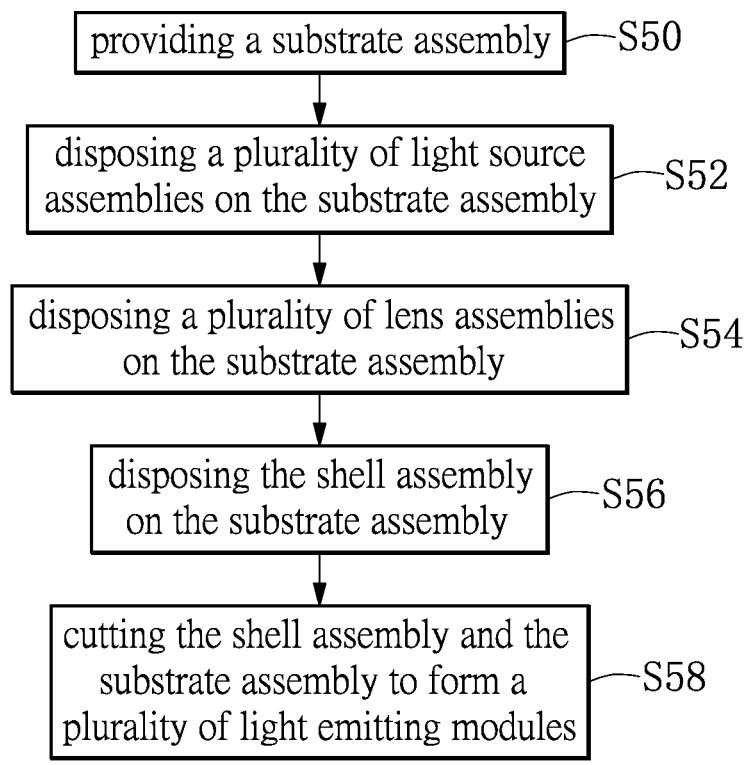
FIG. 16 is a flowchart of a manufacturing method of the lighting module in a fourth embodiment of the present disclosure.

References are made to FIG. 16 to FIG. 20, which are to be read in conjunction with FIG. 1 to FIG. 15. FIG. 16 is a flowchart of a manufacturing method of the lighting module in a fourth embodiment of the present disclosure. FIG. 17 to FIG. 20 are schematic views sequentially showing step S50, step S52, step S54, step S56, and step S58 of the manufacturing method of the lighting module in the fourth embodiment of the present disclosure. As shown in the figures, a manufacturing method of the lighting module M is provided in the fourth embodiment of the present disclosure. The manufacturing method includes at least the following steps.

Figure 17:
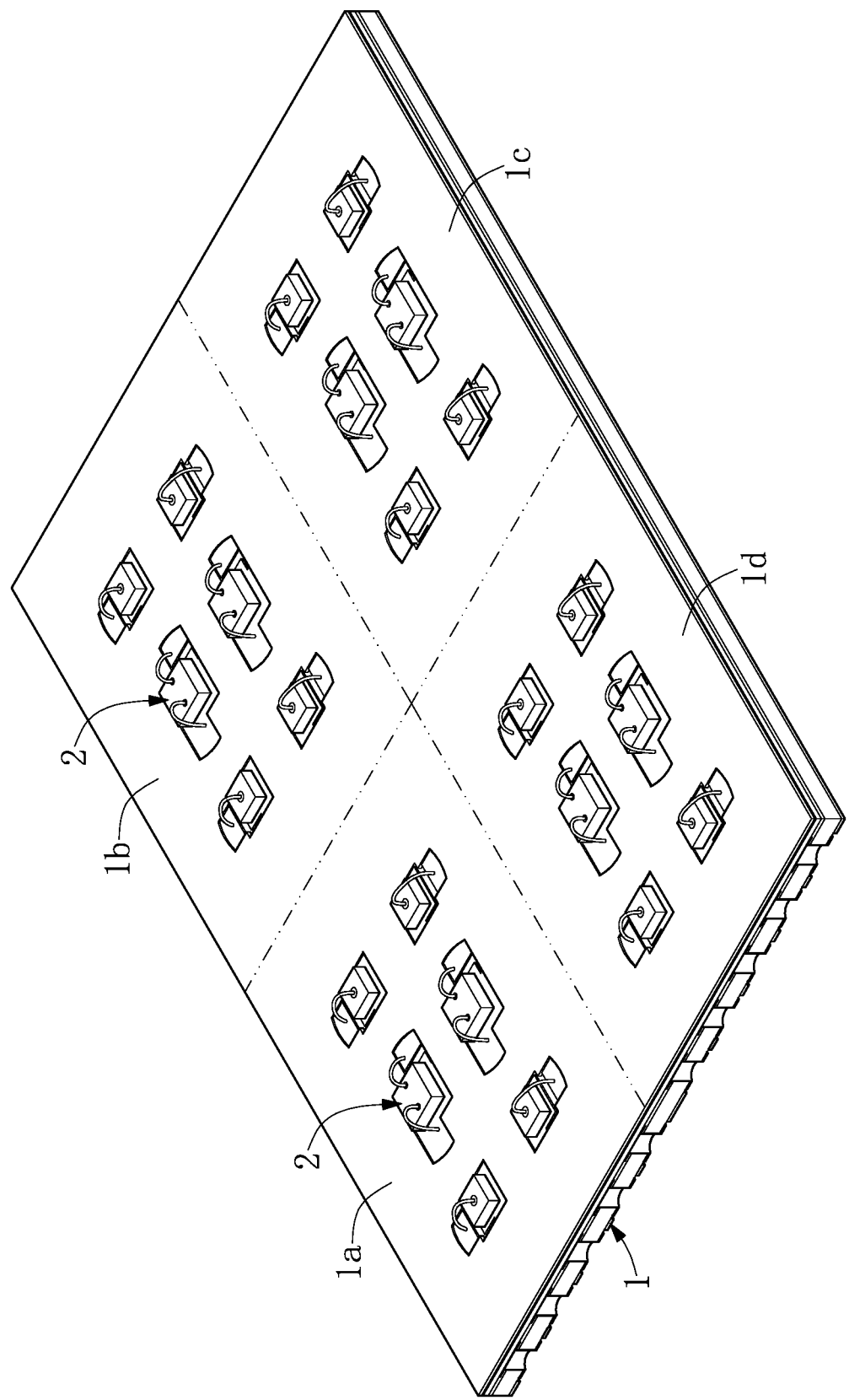
FIG. 17 to FIG. 20 are schematic views sequentially showing step S50, step S52, step S54, step S56, and step S58 of the manufacturing method of the lighting module in the fourth embodiment of the present disclosure.

Firstly, in step S50, the carrier 1 is provided, and the carrier 1 includes a plurality of sections. As shown in FIG. 16 and FIG. 17, the carrier 1 described in this step can be a large original carrier that is not yet cut, and has the sections 1a to 1d. Each of the sections 1a to 1d can be of a size corresponding to one of the carrier assemblies 1 described in the afore-mentioned embodiments. It is worth noticing that, in the fourth embodiment, the carrier 1 is exemplified to have four sections, but the present disclosure is not limited thereto. In practice, the original and uncut carrier 1 can have one or more than one sections.

Next, in step S52, a plurality of light assemblies 2 are disposed on the carrier 1, and each of the light assemblies 2 corresponds to one of the sections 1a to 1d, respectively. As shown in FIG. 16 and FIG. 17,one of the light assemblies 2 can be disposed on each of the sections 1a to 1d.

Figure 18:
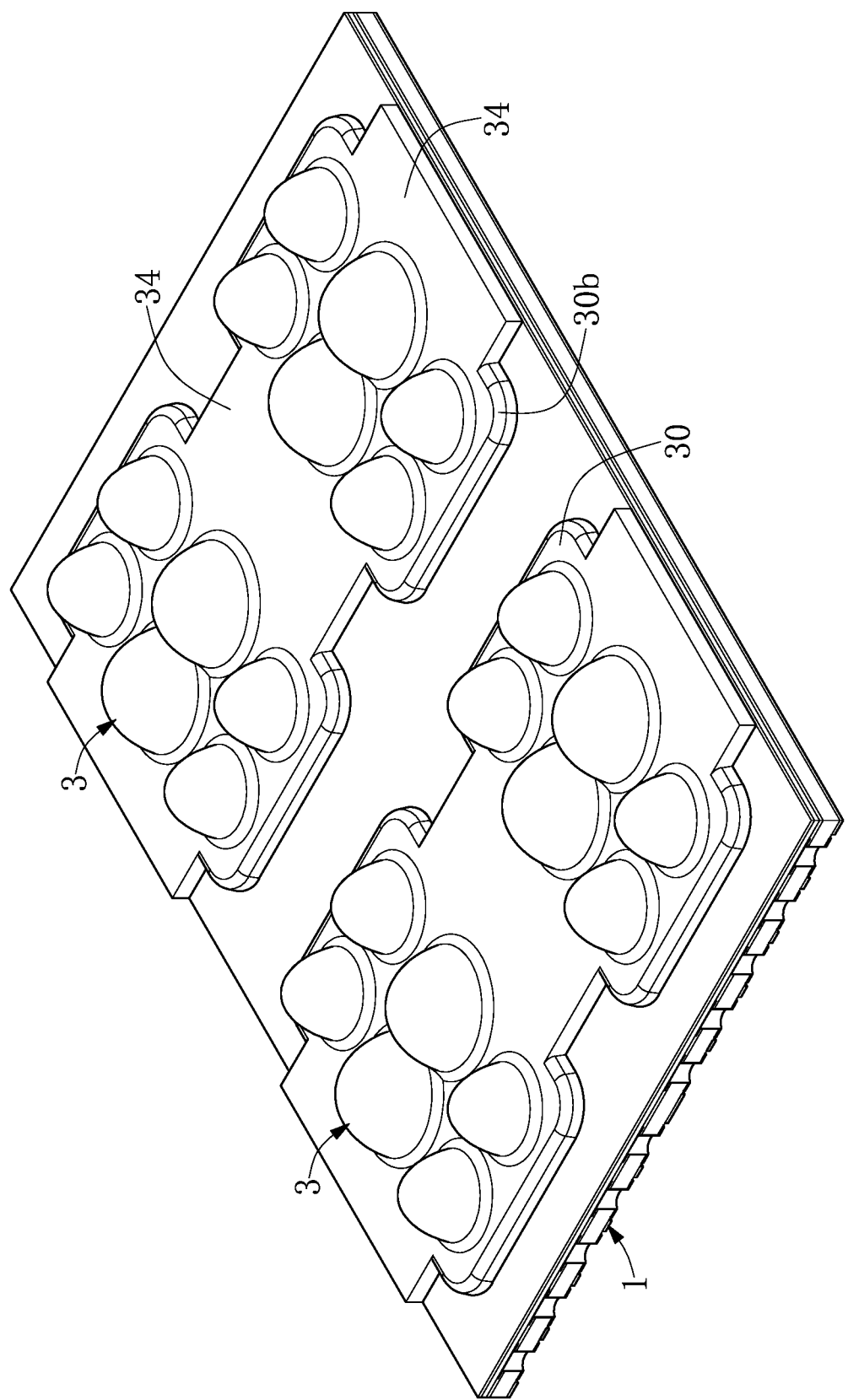

Next, in step S54, a plurality of lens assemblies 3 are disposed on the carrier 1 and cover on the light assemblies 2. Furthermore, the lens assemblies 3 can be formed through molding. During molding, a lens adhesive passage 34 in at least one direction is formed between each two of a plurality of mold units of a mold corresponding to each two adjacent ones of the lens assemblies 3, so as to improve a convenience of a subsequent encapsulating process. That is to say, after the lens assemblies 3 are detached from the mold, as shown in FIG. 16 and FIG. 18, one of the lens assemblies 3 can be disposed on each of the sections 1a to 1d, and the lens adhesive passage 34 can be formed between each two adjacent ones of the lens assemblies 3, such that each two adjacent ones of the lens assemblies 3 are connected to each other through the lens base 30 and the lens adhesive passage 34. More specifically, the lens adhesive passage 34 can be defined on each of two sides of any one of the lens assemblies 3.

Figure 20:
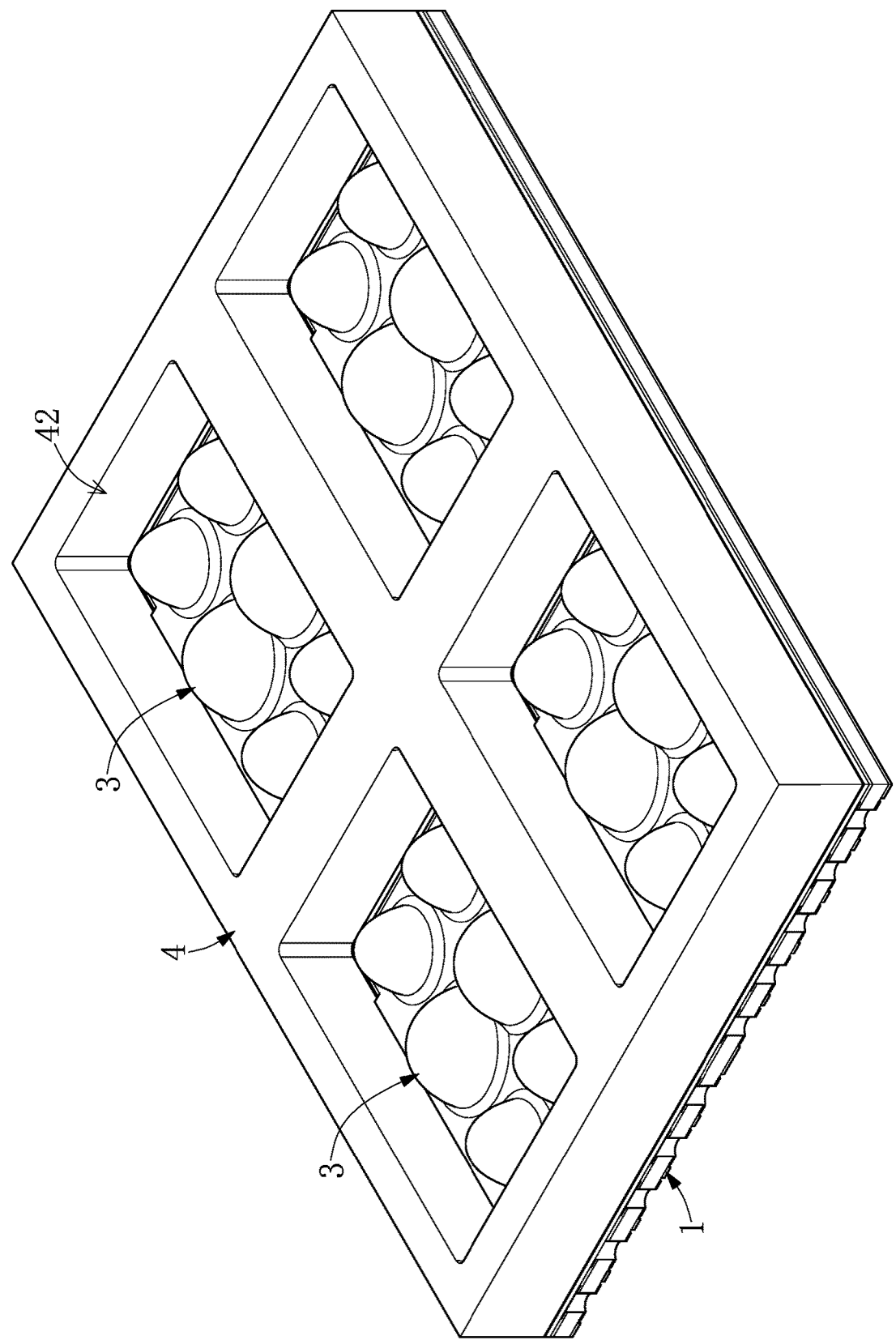

Next, in step S56, a casing 4 is disposed on the carrier 1, and surrounds each of the light assemblies 2 and each of the lens assemblies 3. For example, as shown in FIG. 16 and FIG. 20, the casing 4 in this step can be a large original casing that is not yet cut. The casing 4 in this embodiment can include a plurality of openings 42, and each of the openings 42 corresponds to one of the sections 1a to 1d, respectively.

In addition, before the step of disposing the casing 4 on the carrier 1 (step S56), the manufacturing method further includes:

forming a plurality of grooves G corresponding to the casing 4 on the carrier 1 through blind cutting; and disposing the casing 4 on the corresponding grooves G by the adhesive L1.

Figure 19:
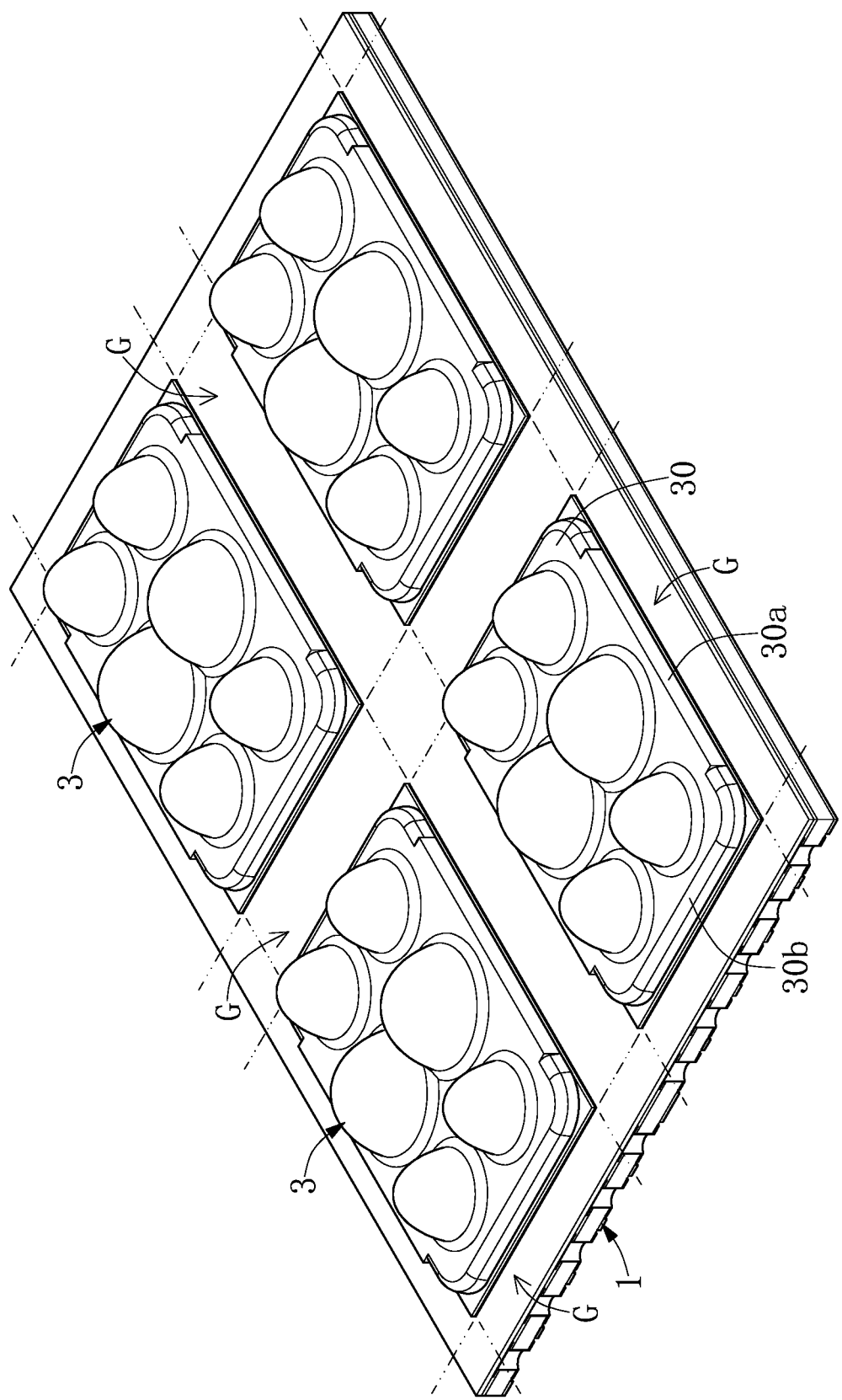

For example, as shown in FIG. 14 and FIG. 19, after blind cutting, a value of the first distance d1 subtracting the second distance d2 is greater than or equal to one third of a summation of respective thicknesses of the first shielding member 11, the first circuit member 12, and the first carrier member 13. In addition, in the step of forming the grooves G corresponding to the casing 4 on the carrier 1 through blind cutting, the manufacturing method further includes: cutting and forming the lens adhesive passage 34 between each two of the lens assemblies 3. That is to say, when blind cutting the carrier 1, the lens adhesive passages 34 are cut away simultaneously. In addition, as shown in FIG. 13, FIG. 18, and FIG. 19, the lens base 30 of each of the lens assemblies 3 has two non-arced sides 30a and two arced sides 30b corresponding to each other. Furthermore, a side surface of discontinuity (unlabeled in the figures) is formed between any one of the two non-arced sides 30a and any one of the two arced sides 30b. In other words, one of the side surfaces of discontinuity can be formed between each of the two non-arced sides 30a and each of the two arced sides 30b; that is to say, in this embodiment, the lens base 30 can have four side surfaces of discontinuity. When the lens adhesive passages 34 on sides of the lens base 30 are cut away, two non-arced sides 30a can be formed on the sides of the lens base 30, but the present disclosure is not limited thereto. Shapes of the two non-arced sides 30a can be different according to different cutting tools that are utilized.

For example, as shown in FIG. 16 to FIG. 20, after step S54, the grooves G can be formed between any two adjacent ones of the sections 1a to 1d through blind cutting the carrier 1, and each of the grooves G is equivalent to (serves as) the recess section 100b described in the afore-mentioned embodiments. In addition, a width of each of the grooves G is greater than that of a bottom surface of the casing 4. In addition, the adhesive L1 is applied on the bottom surface of the casing 4 to adhere and fix the casing 4 on the carrier 1 in a subsequent process. In another implementation, the adhesive L1 can be disposed on the grooves G in advance, but the present disclosure is not limited thereto.

Next, in step S58, the casing 4 and the carrier 1 are cut to form the lighting module M. For example, as shown in FIG. 16 and FIG. 20, in this embodiment, when the casing 4 and the carrier 1 are cut together, a plurality of the lighting modules M described in the above-mentioned embodiments are obtained.

However, the above-mentioned embodiment is merely one of the feasible implementations, and the present disclosure is not limited thereto.

Beneficial Effects of Embodiments

One of the beneficial effects of the lighting module M provided by the present disclosure is that the accuracy and the strength of optical signals of the lighting module M can be enhanced by virtue of "the light assembly 2 being disposed on the carrier 1, and the light assembly 2 including the at least one first lighting unit 21 and the at least one second lighting unit 22", "the lens assembly 3 including the at least one first lens 31 and the at least one second lens 32 connected to the at least one first lens 31, and covering on the light assembly 2", "the casing 4 being disposed on the carrier 1 and surrounding the light assembly 2", "the at least one first lighting unit 21 emitting the first beam having the first wavelength, and the first beam passing through the at least one first lens 31 to form the first light distribution being substantially mesa-shaped", "the at least one second lighting unit 22 emitting the second beam having the second wavelength, and the second beam passing through the at least one second lens 32 to form the second light distribution being substantially twin-peak shaped with a recess in between", and "the first wavelength being less than the second wavelength, and the first view angle of the first light distribution being greater than the second view angle of the second light distribution".

For the light detecting device Z, the lighting module M, and the method of manufacturing the same provided by the present disclosure, inadequacies in optical design of the conventional wearable devices can be improved, the receiving accuracy of the detecting modules S surrounding the lighting module M can be enhanced, and the effect of receiving signals instantly can be realized through utilizing the first beam of the at least one first lighting unit 21 having the first light distribution, the second beam of the at least one second lighting unit 22 having the second light distribution, or the third beam of the at least one third lighting unit 23 having the third light distribution. In addition, the lighting module M of the present disclosure can also reduce the noise interference and improve the signal-to-noise ratio (SNR) through a cooperation of the lens assembly 3 and the casing 4, thereby enhancing strength of optical signals.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting module, comprising:
    a carrier;
    a light assembly disposed on the carrier, the light assembly including at least one first lighting unit and at least one second lighting unit;
    a lens assembly including at least one first lens and at least one second lens connected to the at least one first lens, the at least one first lens and the at least one second lens being disposed on the carrier and covering on the light assembly; and
    a casing disposed on the carrier and surrounding the light assembly;
    wherein the at least one first lighting unit emits a first beam having a first wavelength, and the first beam passes through the at least one first lens to form a first light distribution being substantially mesa-shaped; wherein the at least one second lighting unit emits a second beam having a second wavelength, and the second beam passes through the at least one second lens to form a second light distribution being substantially twin-peak shaped with a recess in between; wherein the first wavelength is less than the second wavelength, and a first view angle of the first light distribution is greater than a second view angle of the second light distribution.

2. The lighting module according to claim 1, wherein the at least one first lighting unit is a plurality of first lighting units, the at least one second lighting unit is a plurality of second lighting units, the at least one first lens is a plurality of first lenses, and the at least one second lens is a plurality of second lenses; wherein each of the first lenses covers a corresponding one of the first lighting units, respectively, and each of the second lenses covers a corresponding one of the second lighting units, respectively;
    wherein any two of the first lenses adjacent to each other are partially overlapped with each other, and any two of the second lenses adjacent to each other are not overlapped with each other.

3. The lighting module according to claim 2, wherein an overlapping distance is defined to be equal to a distance of twice a radius of curvature of the at least one first lens being subtracted by a distance between a central point of each of two adjacent ones of the at least one first lighting unit, and the distance between the central point of each of two adjacent ones of the at least one first lighting unit is defined to be greater than twice a radius of curvature of the at least one second lens.

4. The lighting module according to claim 1, wherein the first view angle is greater than 80 degrees, the first wavelength is between 500 nm and 550 nm, the second view angle is less than 60 degrees, and the second wavelength is between 660 nm and 940 nm.

5. The lighting module according to claim 1, wherein a radius of curvature of the lens assembly is between 0.1 mm and 2 mm, and a radius of curvature of the at least one first lens is greater than that of the at least one second lens.

6. The lighting module according to claim 1, wherein the lens assembly further includes at least one third lens connected to the at least one first lens, the at least one third lens is disposed on the carrier and covers the light assembly; wherein the light assembly further includes at least one third lighting unit emitting a third beam having a third wavelength, the third beam passes through the at least one third lens to form a third light distribution being substantially twin-peak shaped with a recess in between, the third wavelength is greater than the first wavelength, and a third view angle of the third light distribution is less than the first view angle.

7. The lighting module according to claim 6, wherein the at least one third lighting unit is adjacent to the at least one first lighting unit, the third view angle is less than 60 degrees, the third wavelength is between 660 nm and 940 nm, and the third wavelength is different from the second wavelength.

8. The lighting module according to claim 1, wherein an upper surface of the carrier is divided into a protrusion section and a recess section surrounding the protrusion section, a first distance between the protrusion section and a lower surface of the carrier is greater than a second distance between the recess section and the lower surface of the carrier; wherein the light assembly and the lens assembly are positioned at the protrusion section, and the casing is positioned at the recess section.

9. The lighting module according to claim 8, wherein an adhesive is disposed among the casing, the carrier and the lens; wherein the casing has a lower surface facing toward the recess section and an upper surface opposite to the lower surface, and a third distance between the lower surface of the casing and the lower surface of the carrier is less than the first distance.

10. The lighting module according to claim 9, wherein the adhesive has a two-stepped structure that is used to adhere the carrier, the lens assembly, and the casing to one another.

11. The lighting module according to claim 1, wherein the lens assembly has a lens base, the lens base has two non-arced sides and two arced sides corresponding to each other, and a side surface of discontinuity is formed between any one of the two non-arced sides and any one of the two arced sides.

12. A light detecting device comprising the lighting module as claimed in claim 1, and a plurality of detecting modules surrounding the lighting module.

13. A manufacturing method of a lighting module, comprising:
    providing a carrier, the carrier including a plurality of sections;
    disposing a plurality of light assemblies on the carrier, each of the light assemblies corresponding to one of the sections, respectively;
    disposing a plurality of lens assemblies on the carrier and covering on the light assemblies;
    disposing a casing on the carrier and surrounding each of the light assemblies and each of the lens assemblies; and
    cutting the casing and the carrier to form the lighting module;
    wherein, before the step of disposing the casing on the carrier, the manufacturing method further comprises:
    forming a plurality of grooves corresponding to the casing on the carrier through blind cutting; and
    disposing the casing on the corresponding grooves by an adhesive;
    wherein a width of each of the grooves is greater than that of a bottom surface of the casing.

14. The manufacturing method according to claim 13, wherein, in the step of forming the grooves corresponding to the casing on the carrier through blind cutting, the manufacturing method further comprises: cutting and forming a lens adhesive passage between any two adjacent ones of the lens assemblies through blind cutting.

15. A lighting module, comprising:
- a carrier, an upper surface of the carrier including a protrusion section and a recess section surrounding the protrusion section;
- a light assembly disposed on the protrusion section of the carrier;
- a lens assembly covering on the light assembly;
- a casing disposed on the recess section of the carrier and surrounding the light assembly; and
- a two-stepped three-dimensional resin structure disposed on the recess section and at a position where the protrusion section and the recess section connect with each other, so as to adhere the carrier, the lens assembly, and the casing to one another.

16. The lighting module according to claim 15, wherein a first distance between the protrusion section and a lower surface of the carrier is greater than a second distance between the recess section and the lower surface of the carrier, the casing has a lower surface facing toward the recess section and an upper surface opposite to the lower surface, and a third distance between the lower surface of the casing and the lower surface of the carrier is less than the first distance.

17. The lighting module according to claim 15, wherein the carrier includes a first shielding member, a first circuit member, a first carrier member, a second circuit member, a second carrier member, a third circuit member, and a second shielding member; wherein the first circuit member is disposed on an upper surface of the first carrier member, the first shielding board is disposed on the upper surface of the first carrier member and shields a part of the first circuit member, the second circuit member is disposed between a lower surface of the first carrier member and an upper surface of the second carrier member, the third circuit member is disposed on a lower surface of the second carrier member, the second circuit member is connected to the third circuit member, and the second shielding member is disposed on the lower surface of the second carrier member and shields a part of the third circuit member; wherein the light assembly and the lens assembly are disposed on the first shielding member, and the light assembly is electrically connected to the first circuit member.

18. The lighting module according to claim 17, wherein a plurality of semi-blind holes are formed on a side of the second carrier member, a sidewall of each of the semi-blind holes has a metal layer, and the second circuit member and the third circuit member are conducted to each other through the metal layer.

19. The lighting module according to claim 15, wherein the lens assembly has a lens base, the lens base has two non-arced sides and two arced sides corresponding to each other, and a side surface of discontinuity is formed between any one of the two non-arced sides and any one of the two arced sides.

\* \* \* \* \*